United States Patent
Kundu

(10) Patent No.: US 10,380,682 B2
(45) Date of Patent: Aug. 13, 2019

(54) USER CONTROLLED COLLABORATIVE ASPIRATIONAL SAVINGS SOCIAL NETWORK SYSTEM AND METHOD HAVING USER CONTROLLED WHITEBOARD SYSTEM ENABLING ARTICULATION AND END-TO-END FULFILLMENT OF ASPIRATIONS

(71) Applicant: INSPIRAVE, LLC., Pittsburgh, PA (US)

(72) Inventor: Parikshit Om Kundu, Pittsburgh, PA (US)

(73) Assignee: INSPIRAVE, LLC., Pittsburgh, PA (US)

( * ) Notice: Subject to any disclaimer, the term of this patent is extended or adjusted under 35 U.S.C. 154(b) by 462 days.

(21) Appl. No.: 15/163,000

(22) Filed: May 24, 2016

(65) Prior Publication Data
US 2016/0267601 A1    Sep. 15, 2016

Related U.S. Application Data

(63) Continuation-in-part of application No. PCT/US2014/067055, filed on Nov. 24, 2014.
(Continued)

(51) Int. Cl.
*G06Q 20/10* (2012.01)
*G06Q 30/02* (2012.01)
(Continued)

(52) U.S. Cl.
CPC ............ *G06Q 40/02* (2013.01); *G06Q 20/10* (2013.01); *G06Q 30/0279* (2013.01); *G06Q 40/06* (2013.01); *G06Q 50/01* (2013.01)

(58) Field of Classification Search
CPC .... G06Q 40/02; G06Q 20/10; G06Q 30/0279; G06Q 50/01
See application file for complete search history.

(56) References Cited

U.S. PATENT DOCUMENTS

2005/0222951 A1    10/2005  Sherman
2006/0167780 A1     7/2006  Friedman
(Continued)

FOREIGN PATENT DOCUMENTS

WO    WO 2015007689    5/2015

OTHER PUBLICATIONS

"Shoppers receive rebate at DonationTree.com", Telecomworldwire: NA. Normans Media Ltd. (Dec. 17, 2002). (Year: 2002).*

*Primary Examiner* — Eric T Wong
(74) *Attorney, Agent, or Firm* — Blynn L. Shideler; Krisanne Shideler; BLK Law Group

(57) ABSTRACT

An internet-based, user-controlled aspirational savings social network system and associated method for end-to-end articulation, savings, and fulfillment of user's aspirations bridges the existing chasm between the user's savings and the purpose for their savings. A network platform facilitates users to discover and articulate aspirations and connects individual accounts assigned to the user's aspirational goals. A plan is developed for each account and a collaborative savings amplification tool of the platform increases the effective monetary amounts beyond the user's principal contributions and/or reduces the price of the aspired goods or services to advance the plan in ways that fulfill the aspirational goals. The network platform engages with a plurality of merchants associated with the aspirational goals to supply the goods or services and yield a comprehensive end-to-end solution. The saving social network system and (Continued)

method allows users to attain aspirations, including those that may otherwise have been out-of-reach.

17 Claims, 11 Drawing Sheets

Related U.S. Application Data

(60) Provisional application No. 62/166,361, filed on May 26, 2015, provisional application No. 61/908,156, filed on Nov. 24, 2013, provisional application No. 61/908,157, filed on Nov. 24, 2013, provisional application No. 62/002,991, filed on May 26, 2014.

(51) Int. Cl.
*G06Q 40/02* (2012.01)
*G06Q 40/06* (2012.01)
*G06Q 50/00* (2012.01)

(56) References Cited

U.S. PATENT DOCUMENTS

| | | |
|---|---|---|
| 2006/0242041 A1 | 10/2006 | Canney |
| 2007/0198382 A1 | 8/2007 | Ferrari |
| 2009/0063332 A1 | 3/2009 | Tabaczynski et al. |
| 2009/0187505 A1 | 7/2009 | Ariely |
| 2010/0010886 A1* | 1/2010 | Flynn, Jr. ............ G06Q 20/02 705/14.15 |
| 2011/0137794 A1 | 6/2011 | Ferrari et al. |
| 2013/0097060 A1* | 4/2013 | Taylor ............ G06Q 40/00 705/35 |
| 2013/0262237 A1 | 10/2013 | Gaskell, II |
| 2013/0297450 A1 | 11/2013 | Gaskell, II |
| 2013/0297470 A1 | 11/2013 | Gaskell, II |
| 2013/0297471 A1 | 11/2013 | Gaskell, II |
| 2013/0311326 A1 | 11/2013 | Lucas et al. |
| 2015/0017611 A1* | 1/2015 | Moumneh ............ G09B 5/00 434/107 |

* cited by examiner

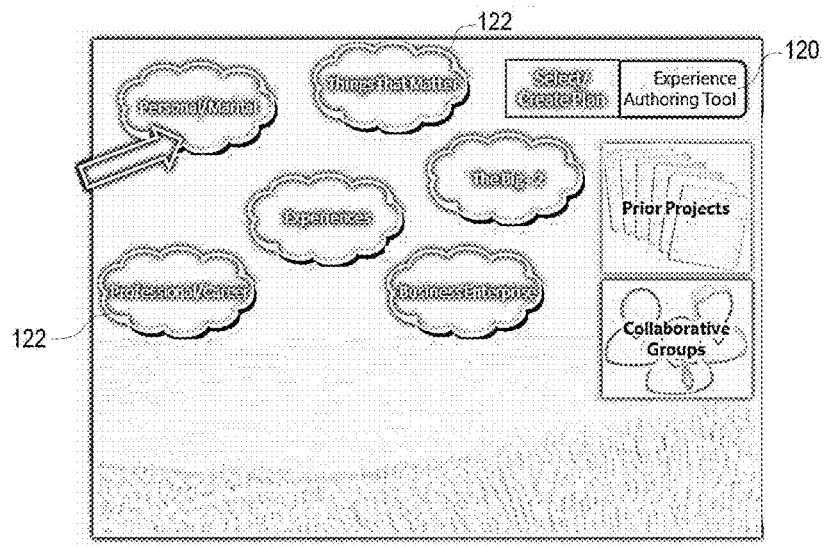
FIG. 2A
FIG. 2B
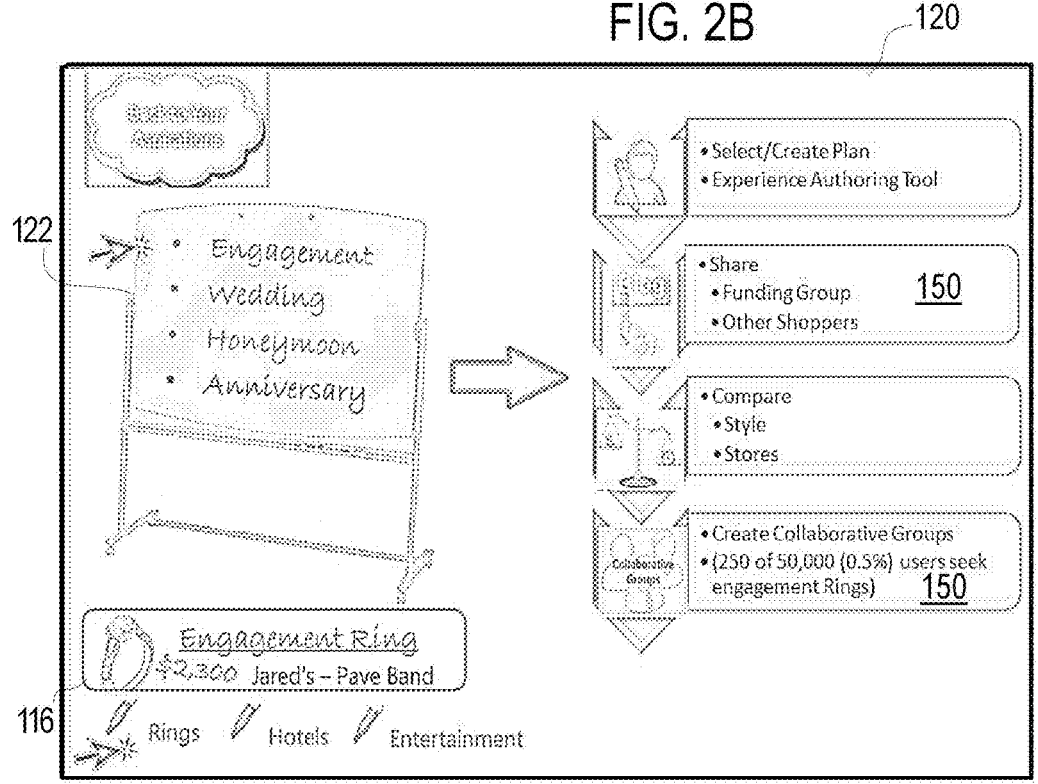

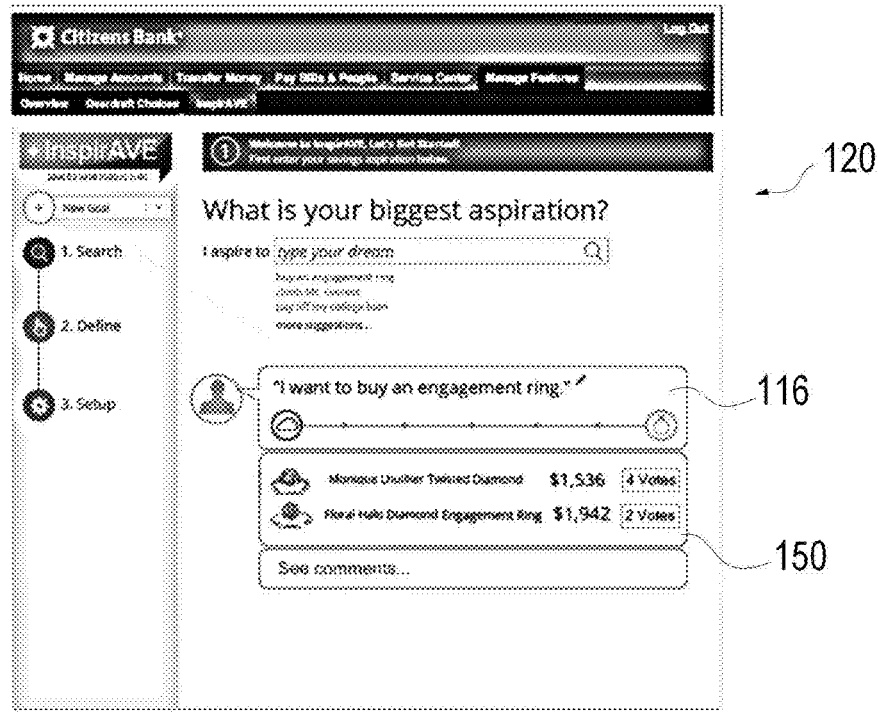
FIG. 3C
FIG. 3F
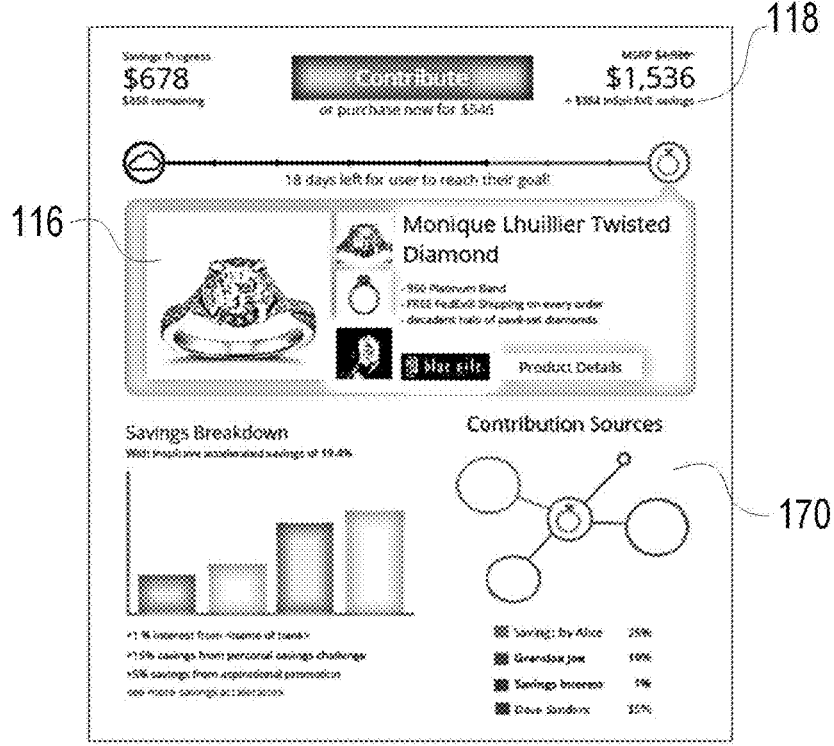

USER CONTROLLED COLLABORATIVE ASPIRATIONAL SAVINGS SOCIAL NETWORK SYSTEM AND METHOD HAVING USER CONTROLLED WHITEBOARD SYSTEM ENABLING ARTICULATION AND END-TO-END FULFILLMENT OF ASPIRATIONS

RELATED APPLICATIONS

This application is a continuation-in-part of international patent application PCT/US14/67055 filed Nov. 24, 2014 entitled "User Controlled Collaborative Aspirational Savings Social Network System and Method" which published May 28, 2015 as WO 2015-007689, which publication is incorporated herein by reference.

This application claims the benefit of U.S. Patent Application Ser. No. 62/166,361 entitled "User Controlled Whiteboard System and Method Enabling Articulation and End-to-End Fulfillment of Aspirations" filed May 26, 2015, which application is incorporated herein by reference.

International patent application PCT/US14/67055 claims the benefit of U.S. Patent Application Ser. No. 61/908,156 entitled "Personalized and Collaborative Savings Platform" filed Nov. 24, 2013. International patent application PCT/US14/67055 claims the benefit of U.S. Patent Application Ser. No. 61/908,157 entitled "User Collaboration through a Platform that Enables Elevated Savings, Elevated Experiences, Elevated Productization/Design/Innovation" filed Nov. 24, 2013. International patent application PCT/US14/67055 claims the benefit of U.S. Patent Application Ser. No. 62/002,991 entitled "Whiteboard to Enable Articulation and End-to-End Fulfillment of Aspirations" filed May 26, 2014. These applications are incorporated herein by reference.

BACKGROUND OF THE INVENTION

1. Field of the Invention

This invention provides a social network based platform that renders a purpose to savings and to social networks and at a certain level acts to redefine the nature of money. Specifically, the invention relates generally to user controlled aspirational savings and associated social networks and methods for facilitating money management, and more particularly, to systems and methods facilitating alternative savings arrangements focused on incentivizing user savings and tailoring savings to user aspirations, wishes, or, goals. Additionally the invention described herein relates generally to a platform which enables users to identify aspirations, wishes and goals which include aspects touching on and concerning money management, and more particularly, to alternative savings arrangements focused on incentivizing user savings and tailoring savings to user aspirations, wishes, or, goals, as well as linking users of various types in such endeavors.

2. Background Information

There are a variety of savings vehicles available for users today. For example, users may choose a traditional savings account at a financial institution (such as a "bank", although the phrase financial institution as used in this application shall encompass broader category of institutions such as: banks, credit unions, API providers, and yet others such as BITCOIN, WALMART, GOOGLE that issue prepaid cards, etc, such as money and payment management institutions). In exchange for deposits, the user receives interest paid on the savings account from the financial institution, e.g., in the form of money (currency) accrued on the principal amount. This form or arrangement incentivizes users to save with the promise of a return on investment, e.g., a fixed amount of money in the form of a percentage of the principal placed in savings according to a schedule, e.g., annual.

Other conventional savings involve more risk, for example users may take equity positions in a business, thereby exchanging money for stock. This may be viewed as a form of savings inasmuch as the user has spent money in exchange for an asset that may be converted, sold or otherwise form a realized gain. Here, the incentive for the user is again found in the hope that the thing purchased ultimately may be resold for more money, e.g., on a stock exchange.

All such savings examples focus on incentivizing the user to save by using a currency or monetary return on investment. Thus, users often place money into a savings account in exchange for either a guaranteed monetary return (e.g., for savings accounts, money market accounts, certificates of deposit, bonds, etc.) or in exchange for an instrument or item (e.g., stock, commodity, precious metal, house) that may be re-sold for monetary return.

It has been observed that "in years past financial institutions offered savings programs specifically designed for a specific purpose such as a vacation. Periodically a customer would deposit funds in this account until the savings goal was met. These types of savings programs were particularly helpful in teaching children the value of savings. Over the years, these types of programs, in light of technical advances and other factors, were discontinued." In response to this observation it has noted that now, "through advantages provided by the Internet, the charm and value of these purchase defined savings accounts can be recreated with added features and benefits that educate customers and children on the value of saving for items they desire to purchase."

U.S. published patent applications 2005-0222951 entitled "Systems and Methods of Targeted Savings" discloses a method of targeting savings deposits that enable a depositor, such as a customer of a financial institution, to save money for various purposes or goals. A financial institution can make offers for targeting savings deposits to its customers using a financial statement that the financial institution prepares and provides to its customers to report information related to customers' financial accounts. Such offers can be solicited or unsolicited and can include one or more targeted savings plans customized to meet customers' savings goals. The financial statement can be further used to enable customers to enroll in one or more targeted savings plans and to make savings transactions according to such plans. A credit card account statement can be used for such purposes such that customers can make targeted savings deposits along with making payments to credit card accounts. This methodology fails to provide a platform that facilitates or enhances user discovery and articulation of a user's aspiration, nor which effectively allows users to attain aspirations otherwise out of their reach, nor which efficiently supplies an end-to-end solution for users and does not fully maximize gains for the user savings that can be achieved with such integration.

U.S. published patent applications 2007-0198382 and 2011-0137794 each disclose a method of saving for a time delayed purchase includes establishing a savings account through a website provided by a third party service provider. The savings account establishes the savings goal, the time frame, the recommended contribution, and the savings category and/or category of retailer(s). Once established, a customer designates the account as public or private. For a private account, funds are transferred from the customer's financial institution based upon approved parameters. For a public account, a notification is sent to potential third party contributors who make a gift to the public account that is held by the service provider. The customer is given the option of accepting the gift, whereby funds are transferred from the service provider to the public account. This methodology fails to provide a platform that facilitates or enhances user discovery and articulation of a user's aspiration, nor which effectively allows users to attain aspirations otherwise out of their reach, nor which efficiently supplies an end-to-end solution for users and does not fully maximize gains for the user savings that can be achieved with such integration.

U.S. published patent application 2009-0063332 entitled "Flexible Automatic Savings Program" discloses flexible automatic savings programs and/or processes in which a consumer is presented with multiple options for automatic savings to be applied to transactions, such that savings amounts are transferred from a first account to a second account automatically for qualified accounts and transactions. A financial institution can assist the consumer select one of the options to apply to automatic transfers. Transfer policy can thus be customized for a consumer according to their savings needs and goals. Participation is limited to common, or overlapping, ownership status with respect to both source and target accounts, though other ownership entities can also be present. The way that savings amounts are determined for automatic transfers can also be dynamically customized to savings characteristics or goals of the consumer as those characteristics or goals change. This useful flexible savings account management aspect is helpful but fails to provide a platform that facilitates or enhances user discovery and articulation of a user's aspiration, nor which effectively allows users to attain aspirations otherwise out of their reach, nor which efficiently supplies an end-to-end solution for users.

U.S. published patent application 2009-0187505 entitled "Online Savings Network" discloses the implementing of an online savings network which includes creating a network account for an owner and associating an investment account to the network account, wherein the account owner then invites family members, friends and/or contacts, via social networks, to join the online savings sub-network as a contributor and to contribute toward the owner's savings goal. This useful crowd-funding aspect is helpful but fails to provide a platform that facilitates or enhances user discovery and articulation of a user's aspiration, nor which effectively allows users to attain aspirations otherwise out of their reach, nor which efficiently supplies an end-to-end solution for users.

U.S. published patent application 2013-0097060 entitled "Educational and Game-Based Banking Application whereby Youth Earn Real Money toward Specific Savings, Spending and Charity Goals" discloses a youth orientated money management method that teaches financial literacy. According to this methodology, an account owner, such as a parent, grandparent, or legal guardian, makes money available to be earned through the system. According to this methodology, an account beneficiary, such as a minor under the age of 18, earns money by completing a series of educational lessons and games (known in the system as "challenges"). Once earned, money is allocated by the beneficiary to specific savings, spending, and charity goals (known as "funds"). The amount of money earned for a given challenge is dependent upon the goal ("fund") to which it is allocated. Account owners can make additional moneys available (known as a "match") for specific savings and charity goals. Funds integrate on the back-end with traditional financial products, such as checking, savings, and/or prepaid accounts. The system is proposed to be managed on mobile devices, e.g. smartphones. This methodology is helpful, particularly educating youth about savings, but fails to provide a platform that facilitates or enhances user discovery and articulation of a user's aspiration, nor which effectively allows users to attain aspirations otherwise out of their reach other than through the designated sponsor's benevolence, nor which efficiently supplies an end-to-end solution for users including the actual delivery of the subject goal to the user from the merchant.

The system of U.S. published patent application 2013-0097060 is representative of the prior art approaches in that it is focused on savings and money management rather that focused on identification of user aspirations and attaining goals. Money management is not as interesting to everyday users and consumers, however their aspirations are, of course, are of great interest and attaining such aspirations can be a primary interest to consumers. These prior art money management systems do not integrate the merchants as an integral part of the system which prevents them from taking part in helping shape the goals, amplify the user savings to facilitate the user goals, or ship the product or deliver the service directly to the user upon realization of the user's aspirations.

U.S. published patent application 2013-0262237 entitled "Method of Marketing Based upon a Saving Goal" observes while "various savings programs are known in the art, utilizing information related to the savings program to build a more effective relationship is difficult as often the information is not available, or is stored in such a manner that the information is difficult to sort in order to provide meaningful information to build a better relationship. Even if assembled, there exists no relatively simple and efficient method to utilize the information in a manner that benefits both the consumer and the financial institution. Accordingly, there exists a need in the art for a method or system that addresses these deficiencies." The application provides "a method to market selected products to customers based upon their savings goals" and "a method where information related to a savings goal is managed and used to build a personal relationship with a consumer" and "a method of marketing based upon a savings goal where marketing messages are created related to savings goal criteria." This methodology again fails to provide a platform that facilitates or enhances user discovery and articulation of a user's aspiration, nor which effectively allows users to attain aspirations otherwise out of their reach, nor which efficiently supplies an end-to-end solution for users, and further it does not maximize gains for the user savings that can be achieved with such end-to-end integration.

U.S. published patent application 2013-0297471 entitled "Method of Generating Social Network Notification within a Goal Based Financial Account" observes that as "the Internet and social networking have become more prevalent, entities such as financial institutions are challenged to develop a social network presence. While various social networks and savings programs are known in the art, utilizing automated and customized posts based on account activity to post messages to social networks is difficult as often the two networks do not communicate and the information of one is independent of another." This development sets forth a "method [for] customers to customize and automate posts and tweets to their social networks based on activity in their goal based savings or DDA account, and "a method where activity related to a savings or DDA account is managed", and allegedly "a method of customization for the account owner and control over the automated communication being posted based on their savings or DDA account activity." This methodology, however, fails to provide a platform that facilitates or enhances user discovery and articulation of a user's aspiration, nor which effectively allows users to attain aspirations otherwise out of their reach, nor which efficiently supplies an end-to-end solution for users and, again, is not actually directed to such a comprehensive integrated approach. Further this methodology does not effectively maximize gains for the user savings.

Other related background includes published patent application 2013-0297470 entitled "Method to Open and Manage Multiple Term Deposit Products, each Tied to an Individual Savings Objective, within one Account" which notes a "need to offer multiple term deposit products tied to individual savings objectives, within one account" and notes "individual savings objectives can be assigned to each of the individual term deposit products." Also published patent application 2013-0297450 entitled and related to "Method of Withdrawal of Funds from Bank Account to Purchase Retail Gift Cards and/or Electronic Retail Gift Codes Generating Cash Rewards to Consumer and/or Revenue to Financial Institution." Published patent application 2006-0242041 entitled "Method and Financing System for Funding a Personal Account" wherein "funding a personal savings account is accomplished by a donor selecting a personal account to be funded, the donor using a financial instrument which generates an embedded fee or an awards or loyalty program, and directing a portion of the embedded fee or awards program into the donor-designated account." For general information, see published patent application 2006-0167780 entitled "College Savings Plan Account Registry and Method"; published patent application 2010-0010886 entitled "System and Method for Facilitating and Encouraging Charitable Giving" (micro-donations); and published patent application 2013-0311326 entitled "Virtual Registry". All of the above cited publications are incorporated herein by reference and are helpful to establish the scope and content of the prior art as well as the relevant level of skill in this art.

Despite various attempts to address limited aspects of the problems with the current system for retail consumption, none of the proposed systems or methods adequately addresses the current problem with retail consumption. The problems are schematically illustrated, in part, in FIGS. 1A and B. FIG. 1A is a schematic representation of the driving force in the current state of marketing driven retail consumption, namely that retail consumption is driven by ads and marketing 13 that is centered on exposing users to viewing ads goods and services 15 (garnering eyeballs) leading to marketing/advertising driven buying 17 and wherein the history of such compulsive buying is used by marketing to continue the marketing/advertising driven consumption cycle without a real reflection on the actual aspirations, wants and desires of consumers. This is evidenced by one well known sobering characterization that "Advertising has us chasing cars and clothes; working jobs we hate, so we can buy s*** we don't need." (Explicative removed—Chuck Palahniuk, Fight Club). The current marketing driven consumption model is a distraction from savings for actual aspirations or wishes of users and is further evidenced by the current record low savings levels and the fact that consumers up to 30% of income of items they don't recall buying.

FIG. 1B is a schematic representation of the current chasm 99 between user savings or financial institutions 132 and retail establishments or merchants 142 that is present in the current marketing driven, rearward looking system. The chasm or barrier 99 exists because the user savings and the associated financial institutions 132 associated therewith are not primary stake holders in and thus have no integral role in the current system as shown in FIG. 1A. The continued separation of user savings and merchants and the lack of the system being user driven is a hindrance to aspirational savings and forward looking consumer purchasing.

As noted above, the prior art approaches are focused on savings and money management rather that focused on identification of user aspirations, attaining goals and delivery of the goods or services that fulfill the aspirations.

None of the existing systems and methods describes a comprehensive e-commerce solution which facilitates the identification of the user aspirations and whereby upon achievement of a user defined goal or aspiration the merchant delivers the aspirational goal directly to the user without the need for intervening steps (having the user withdrawal the funds and order the goods).

None of the existing systems and methods describes a comprehensive e-commerce solution which facilitates curation by a user's well-wishing community (e.g., friends, family, advisors) in developing and modifying the wish, goal and aspirations of the user and the developing and modifying plan associated therewith (modification can include cancellation of the goal under certain circumstances).

None of the existing systems and methods describes a comprehensive e-commerce solution which facilitates white-boarding co-creation and personalization of user's goals or aspirations through collaboration between user and merchants.

None of the existing systems and methods describes a comprehensive e-commerce solution which is not limited merely to financial applications or savings wherein the platform can be utilized for things outside of money (things money cannot buy—i.e. lunch with a given athlete—social equity, content equity and endorsement equity).

None of the existing systems and methods describes a comprehensive e-commerce solution which provides a comprehensive e-commerce solution that allows for value exchange and value creation.

None of the existing systems and methods describes a comprehensive e-commerce solution which facilitate credit and or insurance underwriting It is an object of the present invention to address the deficiencies of the prior art discussed above and to do so in an efficient, cost effective manner to provide a user controlled collaborative aspirational savings social network system and method which enables users to identify aspirations, wishes and goals which include aspects touching on and concerning money management, and more particularly, to alternative savings arrangements focused on incentivizing user savings and tailoring savings to user aspirations, wishes, or, goals, as well as linking users of various types in such endeavors. Other advantages of the present invention will become apparent from a perusal of the following detailed description of presently preferred embodiments of the invention.

SUMMARY OF THE INVENTION

The various embodiments and examples of the present invention as presented herein are understood to be illustrative of the present invention and not restrictive thereof and are non-limiting with respect to the scope of the invention. The present invention is directed to an internet based user controlled aspirational savings social network system comprising: a host electronic network platform configured to host individual accounts for a plurality of individual platform users, wherein each individual account is assigned an aspirational goal of consumer goods and/or services by the account user, and wherein the host electronic network platform develops, modifies and monitors a savings plan associated with each individual account; an aspirational goal authoring tool on the host electronic network platform accessible by the individual platform users and including at least one category of prospective aspirational goods and services and configured to i) assist individual platform users in discovery and articulation of specific aspirational savings goals to be assigned to each individual account of the user, and ii) assign at least an initial monetary goal amount associated with the individual account based upon the specific aspirational savings goal assigned to the account; a financial institution interface on the host network platform configured to engage with at least one financial institution and to establish each individual account as a depository account with one associated financial institution; a collaborative savings amplifications tool interacting with the host electronic network platform and configured to increase the effective monetary amounts in an individual account to advance the savings plan to the aspirational savings goal above the principal contributions of the user, wherein the collaborative savings amplification tool includes at least one of i) social network based crowdfunding of a specific aspirational goal assigned to one of an individual user's accounts by a user designated well-wishing community, wherein crowdfunding includes both potential monetary amounts and non-monetary contributions which can advise, guide, motivate, modify and fulfill a user aspiration; ii) gamification of individual accounts, wherein the gamification and their associated rewards may be sponsored or provided by any combination of the merchants, financial institutions, members of the users designated well-wishing community, or the host electronic network platform itself; iii) group purchasing discounts attributable to an individual user's accounts wherein a group for group purchasing is formed by a collection of individual platform user's having aligned aspirational goals; iv) reverse auction from merchant; v) maximization of the interest for the individual; vi) content co-creation; and vii) a budgeting tool; and a merchant interface on the host network platform configured to engage with a plurality of retailers, distributors, and/or manufacturers of consumer goods and services associated with each aspirational goal of each individual account.

Within the meaning of this application the users of the system of the invention may be individual consumers or may be businesses or may be organizations (e.g., a local Kiwanis Club). Additionally it is anticipated that the host of the system may, in some circumstances, serve as the associated financial institution or an associated merchant or both. The integration of the merchant or financial institution, or both, within the host of the system of the invention will not change the general operation described below.

Within the meaning of this application the phrase "aspirational goal" means a particular product or service from a merchant to be assigned to an individual saving account. The particular product or service may be varied by the user. Aspirational goals within this application may be interchangeably referenced as user wishes, user goals, user aspirations, aspirational savings goals, and various combinations of these terms.

Within the meaning of this application the phrase "a savings plan" means the generation of a timeline with identifiable quantified steps in which a user can attain the monetary goal amount in an individual account associated with an aspirational goal.

Within the meaning of this application the phrase "initial monetary goal amount" means an initial value that the system places upon the assigned aspirational goal for initially developing the savings plan. The actual monetary goal amount for any aspirational goal can vary over time.

Within the meaning of this application the phrase "collaborative savings amplifications tool" means those aspects of the system and methodology of the invention which are configured to increase the effective monetary amounts in an individual account to advance the savings plan to the aspirational goal above the principal contributions of the user.

Within the meaning of this application the phrase "effective monetary amounts" means both positive monetary amounts (i.e., money added to an individual account, such as from the user, from friends, from gamification, etc.) and decreases in the monetary goal, such as through group buying discounts, merchant discounts, changes to the aspirational goal of the user.

Within the meaning of this application the phrase "principal contributions of the user" means monetary amounts contributed to the account directly from the user.

Within the meaning of this application the phrase "interest earned on the principal contributions of the user" means interest that the financial institution credits to the individual account based upon the principal contributions of the user.

Within the meaning of this application the phrase "social network based crowdfunding of a specific aspirational goal" means broadcasting, or more precisely narrowcasting, the user's specific aspirational goal of an individual account to user selected members of a social network and either i) allowing the members to contribute monetary amounts to the individual account to assist in achieving the savings goal, ii) allowing the members to give feedback to the user that can assist in modifying the aspirational goal, or iii) both i) and ii).

Within the meaning of this application the phrase "gamification of individual accounts" means monetary contributions to an individual account or a plurality of accounts based upon promotional events, such as sweepstakes or rewards upon fulfillment of certain savings requirements, from the merchants or financial institution of the user, or host system, or monetary contributions of users or groups there-of through contests, challenges and the like.

The phrase well-wishing community within the meaning of this application is the set of other users, social network friends and family, and third party advisors (e.g., financial planner from a financial institution or subject matter expert from merchant).

Within the meaning of this application the term "curation" means gathering, organizing and refining of content related to a particular theme or topic. Namely curation is used herein associated with the development of the user's aspirations and of the plan to attain the aspiration.

Within the meaning of this application the phrase "group purchasing discounts" means merchant discounts in the products or services of the specific aspirational goals associated with a group of users with aligned aspirational goals. The group purchasing discounts may be driven from the user's who form groups of users which obtain discounts from the merchants, or from the merchants who identify groups of users and offer discounts thereto.

Within the meaning of this application the phrase "a group" for "group purchasing" is referencing a collection of users of the system that are grouped with aligned aspirational goals.

Within the meaning of this application the phrase "aligned aspirational goals" means similar specific aspirational goals that can be associated with a single merchant sufficient for obtaining group purchasing discounts from the merchant. It is important to note that the specific aspirational goals need not be identical, for example a merchant may group a collection of various types of high end jewelry from various users' specific aspirational goals together as a group of aligned aspirational goals (rather than only grouping diamond rings together).

Within the meaning of this application the phrase "reverse auction" means an offer from the merchant to the user for a product or service associated with an aspirational goal. It is known as a reverse auction because the conventional roles of sellers and buyers are reversed in this context and sellers compete to obtain business from the buyer and, further, prices for the specific goods or services will typically decrease as the sellers undercut each other.

Within the meaning of this application the term "merchant" means a retailer, wholesaler, manufacturer, distributor, vendor or other source of consumer or business goods and services. The terms vendor, wholesaler, manufacturer, distributor, producer and the like may all be used interchangeably with the term merchant.

Within the meaning of this application the phrase "maximization of the interest for the individual" means consideration of the offerings of one or more financial institutions and optimizing the interest available to an individual user, which may include collecting or combining multiple user funds into a combined account (e.g., a "sweep account") to increase the yield for an individual.

Within the meaning of this application the phrase "user interactive social trade-off analysis" means interacting with the user to allow for balance of user requirements and the time in an associated savings plan for appropriate goods and services that satisfy the given user requirements in the user's discovery and articulation of an aspirational goal.

Within the meaning of this application the phrase "content co-creation" means user customization of merchant products and/or user feedback to merchants in a manner promoting merchant product modification at a macro or individual level. Content co-creation in the present invention is a significant aspect which allows for consumer to business interaction and for customization of existing merchandize and for feedback to merchants, each of which is critically valuable to merchants, which in turn can and will reward customers and thus amplify user savings. The user created merchandize customization will drive newer versions of products and or product offerings. Merchants will use information to modify, change or adjust products at the macro level or at the individual user level as appropriate.

One embodiment of the invention provides an internet based user controlled aspirational savings social network system comprising a host electronic network platform configured to host individual accounts for a plurality of individual users, wherein each individual account is assigned an aspirational goal of goods and/or services by the account user, and wherein the host electronic network platform develops, modifies and monitors a savings plan associated with each individual account; an aspirational goal authoring tool on the network platform configured to assist individual platform users in discovery and articulation of specific aspirational goals to be assigned to each individual account of the user, and to assign at least an initial monetary goal amount associated with the individual account based upon the specific aspirational goal assigned to the account; a financial institution interface on the network platform configured to engage with at least one financial institution and to associate each individual account with one associated depository account with one associated financial institution; a collaborative savings amplifications tool interacting with the host electronic network platform and configured to increase the effective monetary amounts in an individual account to advance the savings plan to the aspirational goal above the principal contributions of the user, wherein the collaborative savings amplification tool includes at least a social network based crowdfunding of a specific aspirational goal assigned to one of an individual user's accounts by a user designated well-wishing community; and group purchasing discounts attributable to an individual user's accounts wherein a group for group purchasing is formed by a collection of individual platform user's having aligned aspirational goals; and a merchant interface on the host network platform configured to engage with a plurality of merchants of consumer goods and services associated with each aspirational goal of each individual account.

The internet based user controlled aspirational savings system according to the invention provides that the host network platform may be configured to co-ordinate the delivery of the goods and service associated with the aspirational goal of an individual account to the user from the merchant when the savings plan associated with that individual account has been achieved. Further, the host network platform may be configured to co-ordinate the transfer of monetary amount from an individual account to the merchant for the goods and service associated with the aspirational goal the when the savings plan associated with that individual account has been achieved.

The internet based user controlled aspirational savings system according to the invention provides that the host electronic network platform which monitors a savings plan associated with each individual account may provide visual indication of the amount of progress of the savings plan. Further the host electronic network platform which develops a savings plan associated with each individual account may provide a user interactive social trade-off analysis between different goods and service to be associated with the aspirational goal. Further, the host electronic network platform which develops a savings plan associated with each individual account may include developing a savings timeline for the savings plan.

The internet based user controlled aspirational savings system according to the invention provides wherein the financial institution interface on the host network platform may review a plurality of depository account types offered by at least one, or more, financial institution in the establishment of each individual account as a depository account with one associated financial institution.

The internet based user controlled aspirational savings system according to the invention, wherein the collaborative savings amplifications tool includes social network based crowdfunding of a specific aspirational goal assigned to one of an individual user's accounts, the user may identify a set of social network users associated with an individual user's account. Further the system may receive and assign monetary amounts to an individual's user account from any of the social network users associated with an individual user's account, and wherein individual platform users can receive feedback within the system from any of the social network users associated with an individual user's account.

The internet based user controlled aspirational savings system according to the invention, wherein the collaborative savings amplifications tool includes group purchasing discounts attributable to an individual user's accounts, provides that a group, for group purchasing, is formed by a collection of individual platform user's having aligned aspirational goals. Further, the groups, for group purchasing, may include groups created by the individual platform users, and the groups, for group purchasing, and may include groups created by the merchants.

The internet based user controlled aspirational savings system according to the invention, wherein the collaborative savings amplifications tool includes gamification of individual accounts, may include gamification by at least one of the financial institutions and the merchants, or gamification from the users (e.g., through user sponsored games, contests or challenges).

The present invention also provides a method of implementing user controlled aspirational savings for specific consumer goods and/or services comprising the steps of: Providing a host electronic network platform configured to host individual accounts for a plurality of individual platform users; Identifying a specific aspirational goal to be assigned to each individual account of the user with an aspirational goal authoring tool on the host electronic network platform accessible by the individual platform users; Assigning an aspirational goal of specific consumer goods and/or services including an initial monetary goal amount by the account user to each individual user's account; Developing, Monitoring and Modifying a savings plan associated with each individual account by the host electronic network platform; Establishing each individual account as a depository account with an associated financial institution through the host electronic network platform; and amplifying the effective monetary amounts in an individual account to advance the savings plan to the aspirational goal above the principal contributions of the user, wherein the amplifying includes at least one of i) social network based crowdfunding of a specific aspirational goal assigned to one of an individual user's accounts; ii) gamification of individual accounts; iii) group purchasing discounts attributable to an individual user's accounts wherein a group for group purchasing is formed by a collection of individual platform user's having aligned aspirational goals; iv) reverse auction from merchants; v) maximization of the interest for the individual and iv) content co-creation.

The method of implementing user controlled aspirational savings for specific consumer goods and/or services according to the invention may further include the steps of coordinating the delivery of the goods and service associated with the aspirational goal of an individual account to the user from the merchant when the savings plan associated with that individual account has been achieved; and coordinating the transfer of monetary amount from an individual account to the merchant for the goods and service associated with the aspirational goal the when the savings plan associated with that individual account has been achieved.

One embodiment of the invention provides a whiteboard platform, e.g., implemented in an electronic device as an automated or semi-automated tool, which assists users in identifying wishes, goals and aspirations. The whiteboard platform may facilitate identification of wishes, goals and aspirations via an interactive assessment tool that guides a user through a process of identifying his or her wishes, goals and aspirations. An embodiment allows a plan or plans to be developed regarding these wishes, goals or aspirations, e.g., such that a user is not only enabled to identify wishes, goals and aspirations, but are also assisted in achieving the same with provisioning of a personalized savings plan or plans. This may include presentation of questions or activities that are generally designed to elicit responses from a user in order to refine broader categories of possible wishes, goals and aspirations. This may include a process of automatically importing information regarding a user or a particular group of users to which the user in question belongs. This imported information may be gathered automatically, semi-automatically or manually and may include information derived directly from the user, indirectly from a user (e.g., via accessing various data bases with which the user has provided information, such as a transaction history stored in a data base), and/or from other users with which the user has some linkage or association.

The whiteboard also permits users to publicize their wishes, goals and aspirations, e.g., using social media connections, friends, contacts, etc. In one aspect of the invention, the whiteboard components may facilitate publicizing or sharing of a user's wishes, goals and aspirations, e.g., via suggesting other users to whom the user in question may publicize the information.

In one embodiment, the whiteboard intelligently identifies users sharing common attributes in order to facilitate interaction there-between, e.g., with goal of building mutually beneficial relationships between users. This may be implemented via the whiteboard automatically leveraging artificial intelligence systems to facilitate such interactions. Such interaction and facilitation of the same may take place on several different levels with several different aims. For example, an embodiment may allow users sharing similar wishes, goals and aspirations to contact one another and interact using the whiteboard. In another example, different types of users may be encouraged to interact with one another. For example, a user having a particular wish, goal or aspiration may be linked to a user having some domain expertise in the area of that wish, goal or aspiration. In at least one embodiment, the whiteboard itself may act as a virtualized user having domain expertise in an area, e.g., financial counseling, life coaching, etc. In another embodiment, the whiteboard may automate the initial contact or linkage between actual; human domain experts and/or other users and a user that has expressed a wish, goal or aspiration.

The whiteboard may be utilized to facilitate commercial activities as well, e.g., aligned with users' expressed wishes, goals and aspirations. For example, the whiteboard may collect, filter and present various metrics that are of interest to various users, e.g., different types of users within the whiteboard system. By way of example, the whiteboard may facilitate dissemination of information, either detailed or generalized (with privacy of users in mind), to various users. For example, individual or personal users may be given information regarding other users within the whiteboard that have similar wishes, goals or aspirations such that interaction and collaboration there between may be facilitated. As another example, users of different types may be given information about one another's presence within the whiteboard. By way of specific example, commercial or corporate users or subscribers may be given information regarding a number of users having a particular wish, goal or aspiration such that the commercial or corporate users are apprised of the same. Likewise, in a complementary way, individual users or groups thereof may be given information regarding commercial or corporate users within the whiteboard system, e.g., those offering goods or services that match some or part of a particular user's plan for achieving a wish, goal or aspiration.

The whiteboard may be utilized in exchange for various items. For example, the operator of the whiteboard or portion thereof may not charge a fee for use, e.g., for individual users or groups thereof. In an embodiment, the operator of the whiteboard or portion thereof may charge a fee for use, e.g., for corporate or commercial users to have access to information regarding individual users or for having direct access or linkage thereto. In an embodiment, the whiteboard may include commercial mechanisms, e.g., such as facilitating online shopping for goods and services offered among the users of the whiteboard and payment for the same. Additionally, the whiteboard may operate to collect fees from various users, e.g., transaction fees, etc.

The system of the present invention provides a comprehensive e-commerce solution for user defined aspirational savings that allows for delivery of goods or services directly to the user from the merchant.

The system of the present invention provides a comprehensive e-commerce solution allows for the curation by the well-wishing community (friends, family, advisors, etc.) in developing and modifying the wish, goal and aspiration and the developing and modifying plan associated therewith (modification can include cancellation of the goal).

The system of the present invention provides a comprehensive e-commerce solution allows for white-boarding co-creation and personalization of goal or aspiration through collaboration between user and merchants and provides an e-commerce solution which is not limited merely to financial applications or savings. The platform can be utilized for things outside of money (things money cannot buy—i.e. lunch with a given athlete—social equity, content equity and endorsement equity).

The platform of the invention yields an e-commerce solution that allows for value exchange and value creation; allows for an effective and efficient (less waste) in gift giving and gift receiving by facilitating signals from the user to the well-wishing community, and extensions thereof, regarding what are the user's aspirations for targeted gifting.

The present system is not just limited to money management but equally, if not more importantly, is focused on goal identification, tracking progress toward and attainment of that goal, and delivery of the goods or services associated with attainment of that goal in ways that reduce, if not eliminate, the focus on money. The system provides users the tools to shift the focus away from money management and savings which often lead to user's inertia (failure to act). Instead the present system provides users to tools for sharper focus toward the curated discovery of the goal, tracking progress toward of the goal and fulfillment and delivery of the goal.

In the implementation of the platform of the present invention the financial services become an embedded design, namely they are largely behind the scenes and/or hidden from the user such that their complexity does not result in user inertia or failure to act. With the "money to the background" aspect of the present system, the present invention maintains a focus on the establishing the user goals, attaining goals and obtaining goods or services associated with the attained goals, rather than focusing on merely money management as do the prior art money management systems.

In the implementation of the platform of the present invention the integration of the merchants, in combination with friends, family advisors and financial institutions, into all phases of the system create networking effects between all the parties at every stage of the process allowing each party to effectively work in the best interest of the user either individually or collaboratively in the identification of, progress towards and fulfillment of the goal.

These and other advantages of the present invention will be clarified in the description of the preferred embodiments taken together with the attached figures.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A-C are schematic representations of screen shots of an aspiration savings goal authoring tool of the internet based user controlled aspirational savings social network system of FIGS. 1C-D;

FIGS. 3A-F are schematic representations of screen shots of an alternative aspiration savings goal authoring tool of the internet based user controlled aspirational savings social network system of FIGS. 1C-D;

DESCRIPTION OF THE PREFERRED EMBODIMENTS

Figure 1A:
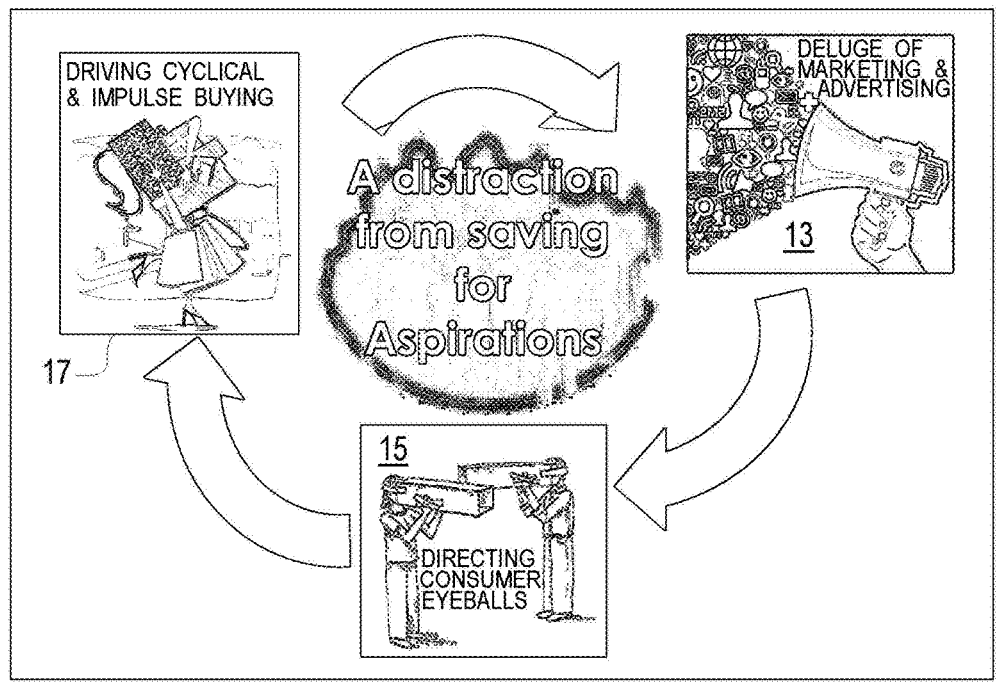
FIG. 1A is a schematic representation of the driving force in the current state of retail consumption.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments. The system 100 described herein provides a user 114 controlled aspirational savings and associated social network platform 110 and methods for facilitating money management, and more particularly, to systems and methods facilitating alternative savings arrangements focused on incentivizing user 114 savings and tailoring savings to user aspirations, wishes, or, goals 116.

The system 100 provides a personalized and collaborative savings platform 110 yielding a comprehensive end to end forward looking solution. The social network platform 110 promotes user 114 collaboration that facilitates exploration, articulation and identification of aspirations and facilitates savings (via dedicated accounts 112) and end to end fulfillment of user aspirations 116. The system 100 is a forward looking marketplace as consumers are working toward aspirations 116 rather than driven by marketer's promotions and merchants 142 can also look toward current aspirations 116 of users 114 rather than only to historical sales.

Accounts 112 of users 114 are sometimes referenced herein as savings accounts 112, however they should not be considered to be limited to a bank "savings account" as one limited type of financial savings instrument. As noted herein the term "savings" is a broader term than the restrictive definition of the excess of a user's income over expenses, and similarly the phrase "savings accounts 112" is representative of any wide number of savings vehicles, including conventional bank savings accounts, or checking accounts, or money market accounts, certificates of deposit, or prepaid savings cards, to list a few representative examples. The system 100 will have the flexibility to select the best type of account available to the user 114 for a given account 112 from any of the available financial institutions 132.

Figure 1B:
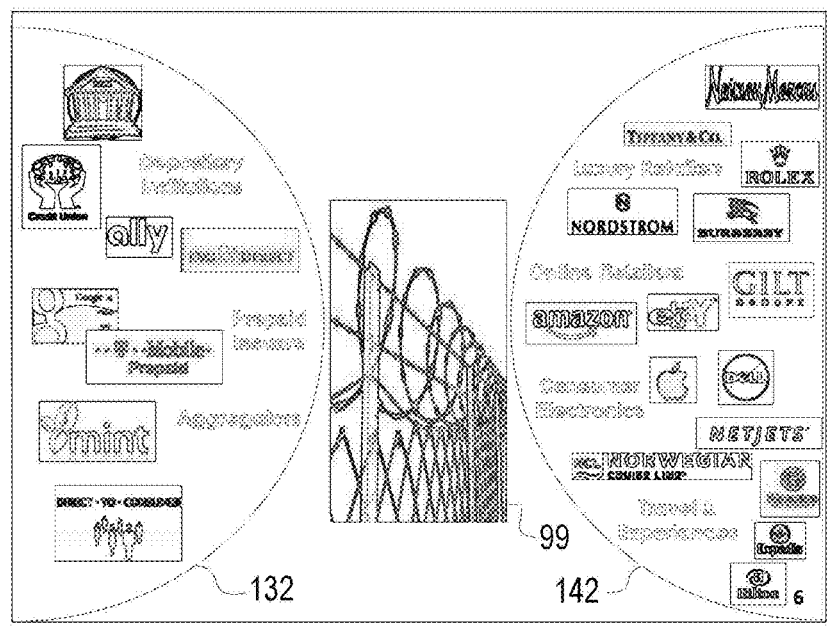
FIG. 1B is a schematic representation of the current chasm between user savings and retail establishments.

As opposed to conventional market driven solutions, the system 100 of the invention as described herein is designed to make the demand chain more efficient. The system 100 as described below can repurpose social media (social networks 151) and results in additional efficiencies in the marketplace via an aspirational consumption base (as opposed to the prior art marketing consumption base of FIG. 1A). As a demand driven (user controlled aspiration or goal 116 driven) construct the present system 100 can efficiently bridge where a user's money resides with its purpose, eliminating the chasm 99 in the existing marketplace schematically shown in FIG. 1B.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiments. Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As described in greater detail below the present invention is directed to an internet based user controlled aspirational savings social network system 100 comprising: a host electronic network platform 110, which may be on one or more servers 113, and which is configured to host individual accounts 112 for a plurality of individual platform users 114, wherein each individual account 112 is assigned an aspirational goal 116 of consumer goods and/or services by the account user 114, and wherein the host electronic network platform 110 develops, modifies and monitors a savings plan 118 associated with each individual account 112; an aspirational goal authoring tool 120 on the host electronic network platform 110 accessible by the individual platform users 114 and including at least categories 122 of prospective aspirational goods and services which form prospective aspirational goals and configured to i) assist individual platform users 114 in discovery and articulation of an specific aspirational goal 116 to be assigned to each individual account 112 of the user 114, and ii) assign at least an initial monetary goal amount associated with the individual account 112 based upon the specific aspirational goal 116 assigned to the account 112; a financial institution interface 130 on the host network platform 110 configured to engage with at least one financial institution 132 and to establish each individual account 112 as a depository account with one associated financial institution 132; a collaborative savings amplifications tool 150 interacting with the host electronic network platform 110 and configured to increase the effective monetary amounts in an individual account 112 to advance the savings plan 118 to the aspirational goal 116 above the principal contributions of the user 114, wherein the collaborative savings amplification tool 150 at least one of i) social network based crowdfunding of a specific aspirational goal assigned to one of an individual user's accounts by a user designated well-wishing community, wherein crowdfunding includes both potential monetary amounts and non-monetary contributions which can advise, guide, motivate, modify and fulfill a user aspiration; ii) gamification of individual accounts; ii) gamification of individual accounts; iii) group purchasing discounts attributable to an individual user's accounts wherein a group for group purchasing is formed by a collection of individual platform users 114 having aligned aspirational goals; and iv) reverse auction from merchant 142; v) maximization of the interest for the individual user 114 vi) content co-creation; and a merchant interface 140 on the host network platform 110 configured to engage with a plurality of retailers, distributors, and/or manufacturers of consumer goods and services, collectively merchants 142, associated with each aspirational goal 116 of each individual account 112; and a user budgeting tool.

As opposed to conventional savings mechanisms, which tend to incentivize users to save in exchange for guaranteed or risk-based monetary returns, the invention focuses the incentive on why a user 114 saves. Conventional savings products and methods tend to focus on generalized returns, e.g., money, increased value in stock or property, such that there is no real tie-in to the wishes or aspirations of a particular saving user 114.

The present invention incentivizes users 114 to save by associating a user's savings within an individual account 112 with a "greater" purpose or reason to save, specifically the aspirational goal 116 assigned to the account 112. This association more closely ties the offerings available to the personality and aspirations of the user 112. Furthermore, there is a focus on short or mid-term wishes and allowing a user 114 to update or modify the savings plan 118 as the user's aspirations change. Additionally, the system 100 allows the user's wishes to be matched with savings opportunities that are connected to third party merchants 142, not merely products offered by a particular financial intuition 132 or group of related companies. The platform 110 permits various parties (the users 114, financial institutions 132, merchants 142, and social network users 152) to collaborate via an interactive framework provided by the platform 110. An embodiment therefore implements a savings social network platform 110 that various users (including business users) may access and interact with in order to facilitate savings and business interests.

The invention is described in connection with users 114 formed of individual persons; however the invention is not so limited. The users 114 may be individual persons, but may also be business entities or social groups (e.g., school field hockey booster organization; Rotary Club, etc). The system 100 of the present invention directly ties products/services to user's savings as well to the user's aspirations. Therefore, the system 100 of the invention ties together user's savings (current and in the future) with the Internet of Things, including the ecosystem of products, services, and experiences available or catalogued online as well as those that are offline and the merchants or service-providers that provide, produce, or manufacture them. In other words, the present system 100 creates an "Internet of Savings" tying the users' savings (accounts 112)—and at a macro-level the "Savings Ecosystem" comprising of a plurality of users 114 who are all "saving"—with the "Provider Ecosystem" of products, services, and experiences and the merchants 142 (merchants or service-providers) that provide, produce, or manufacture them. Thus, at a macro-level, the system 100 creates a pool of savings that can be linked to merchants 142, merchants and service providers offering goods/services. Moreover, saving users 114 are provided with the ability to leverage this pool of savings to take advantage of scale for group purchasing of goods and services at substantial savings.

At a micro-level, a saving user 114 using the system 100 is able to take advantage of lowered prices, actual savings tied to particular products/services that match to their aspirations 116, and therefore may obtain items (goods/services) that they can both afford and which they actually want. As to a merchant 142 using the system 100, such entities will be better able to tailor their product/service offering to users' aspirations, and purchasing capabilities in terms of actual savings. Savings, as further elaborated on herein, is more than the simple difference between a users 114 disposable income less consumption. Rather, savings is more inclusive and reflects a broader definition including but not limited to (1) holdings directed towards merchandise as part of periodic/day-to-day consumption, and (2) holdings in addition to "disposable income" (e.g., inherited wealth, lottery winnings, etc.).

The system 100 facilitates creation of an "Internet-of-Savings", i.e., connecting the ecosystem of "savings" to the ecosystem of products/services/experiences of value from merchants 142, i.e., connecting savings to aspirations resulting in greater purpose. In so doing, the system 100 inspires and influences elevated savings. The system 100 reduces the complexity and information overload in the savings process (e.g., visual/product-design constructs are provided that shows progress towards fulfillment of aspirations in the system 100 rather than overwhelming a consumer/business saving user with the jargon of interest rates, APYs, etc., that often have no emotional resonance or purpose associated with them). The system 100 provides trusted guidance and deployment of back-end data/analytics/algorithms to provide a savings plan 118 (e.g., principal and timeline needed to achieve savings aspiration goal 116 that is within the user's means). This may include providing advising and counseling, e.g., if an aspirational goal 116 is otherwise not practical.

The system 100 facilitates users 114 collaborating to attain aspirational goals 116 including those that would otherwise hitherto have not have been possible without: a) collaboration/support (e.g., by engaging other designated users/friends/family/financial counselors/product and service and experience subject-matter experts); b) benefiting from the scale and the efficiency that the two connected ecosystems (i.e., savings and products/services/experiences) creates to deliver the highest value at the lowest cost. The system 100 therefore stimulates greater and more thoughtful consumption by tying together in a social network on platform 110 various users, experience advisors, and ecosystems. The system 100 provides feedback loops and mechanisms within the platform 110 among the various collaborators. With feedback loops, e.g., fixing errors or defects with products, adding to product features/functionality based on user feedback that results in either incremental, or, breakthrough product/design/innovation, and both micro- and macro-signals between saver/user and provider/producer/manufacturer of products/goods/services. The system 100 results in elevated experience, elevated efficiency (e.g., pricing of the product/service/experience and/or improvement of its inventory/supply-chain management capabilities) and elevated productization/design/innovation. Various components of system 100 and associated method for savings functionality as described herein may be executed on one or more computer systems, which may interact with various other devices, e.g., a server communicating with system 100.

The system 100 is described as being an internet based system and the communication between the parties through conventional methods. Additionally the individual systems can vary, for example the users 114 may access the platform 110 on the internet via their own device which may be a laptop computer, desk top computer, PDA, notebook computer, netbook computer, tablet computer, smart phone, or other similar device. Additionally the users 114 may access the platform 110 directly (directly to a website of the system 100). Alternatively the access to the platform 110 may be through a financial institution 132 and the financial institution 132 either re-directs the user 114 to the platform 110 (schematically shown in dotted line in FIG. 1C) or the system 100 may be internal to the financial institution 132. Similarly, the users 114 may access platform 110 through a merchant 142 (e.g., the website of a big-box store) and the merchant 142 either re-directs the user 114 to the platform 110 (schematically shown in dotted line in FIG. 1C) or the system 100 may be internal to the merchant 142. Also the users 114 may access platform 110 through an existing social network (e.g., FACEBOOK®) 151 and the social network directs the user 114 to the platform 110.

Access to the platform 110 may require a downloadable application (app) and may further include appropriate security protocols as generally known in the art. It is contemplated that the various functionality described herein be implemented using a single instance of a computer (e.g. at the host), while in other functional aspects of the system 100 will utilize multiple nodes making up the system 100. Thus, as will be appreciated by one skilled in the art, various aspects of the system 100 may be embodied as a system, or device program product and combinations thereof. Accordingly, aspects may take the form of an entirely hardware embodiment or an embodiment including software that may all generally be referred to herein as a "circuit", "module" or "system." Furthermore, aspects may take the form of a device program product embodied in one or more device readable medium(s) having device readable program code embodied therewith. Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media. Program code embodied on a storage medium may be transmitted using any appropriate medium, including but not limited to wireless, wired, optical fiber cable, RF, et cetera, or any suitable combination of the foregoing. Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Determining why Users Save

The aspirational goal authoring tool 120 (or module or more generally the user interface) of the system 100 may assist the user 114 in determining a particular aspirational goal 116 for an for a particular user 114 in a variety of ways, e.g., using existing data associated with the user 114 and conventional data-mining and decision making algorithms to automatically infer and suggest particular aspirational goal 116 of the user 114 or via more explicit mechanisms, e.g., facilitating user 114 selection of a particular aspirational goal 116 from a collection of general aspirational goal 116 general categories 122 thereof. See FIGS. 2A-C and 3A-F for two schematic examples of an operational interactive aspirational goal authoring tool 120. Additional aspects of white-boarding are further elaborated below.

Once a savings wish or aspiration is identified, the system 100 may employ one or a variety of mechanisms by which a user's saving habits are incentivized using the aspiration (also referenced as a wish) identified. Thus, the system 100 converts a return on savings from a generic, unfocused monetary format, e.g., accrued interest on a savings account, to a more wish focused or user-specific return that is personalized to the user 112 and his or her aspiration 116, e.g., a product or service that is associated with a particular user's wants, needs, etc.

Figure 1C:
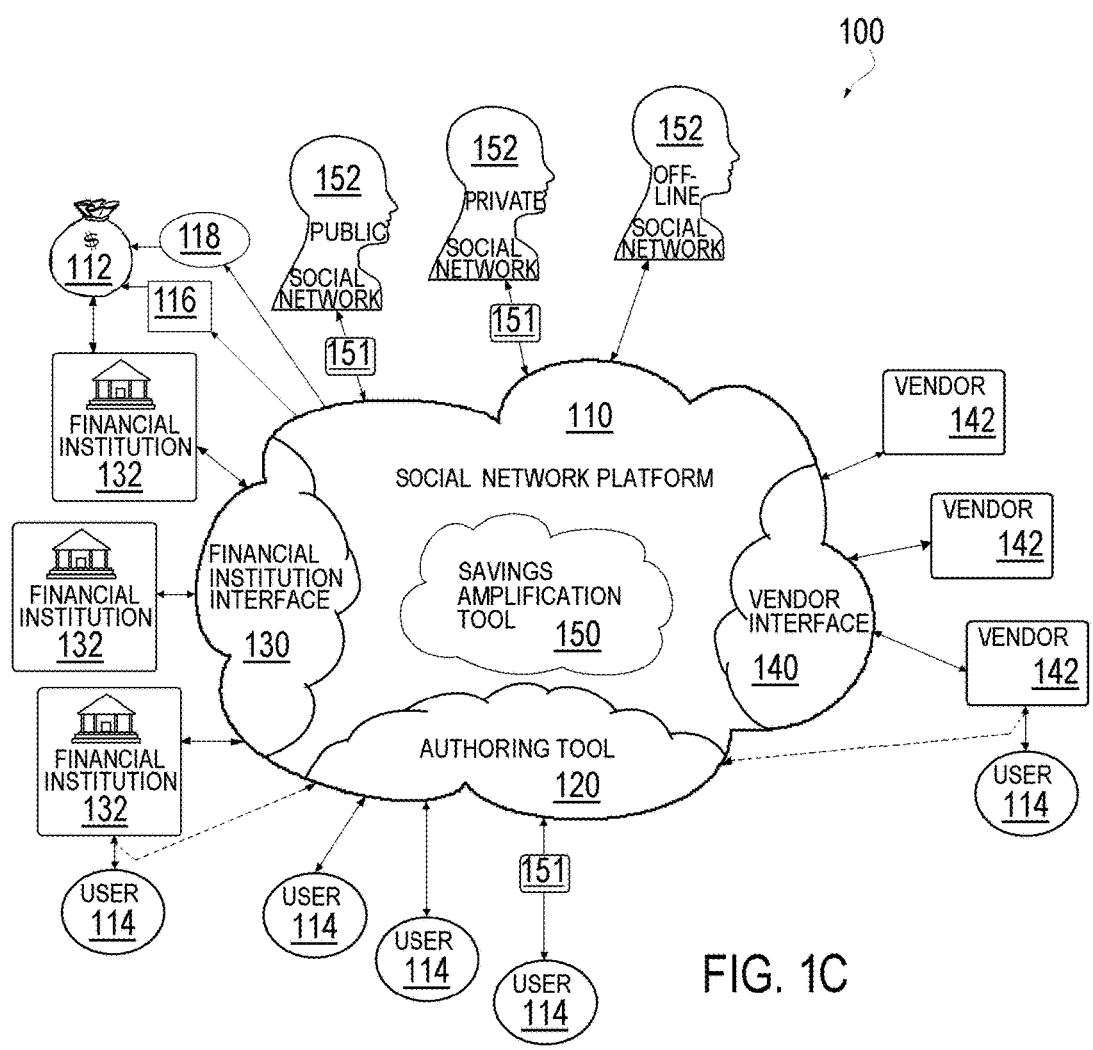
FIGS. 1C and D are schematic representations of an internet based user controlled aspirational savings social network system according to one embodiment of the present invention.
Figure 1D:
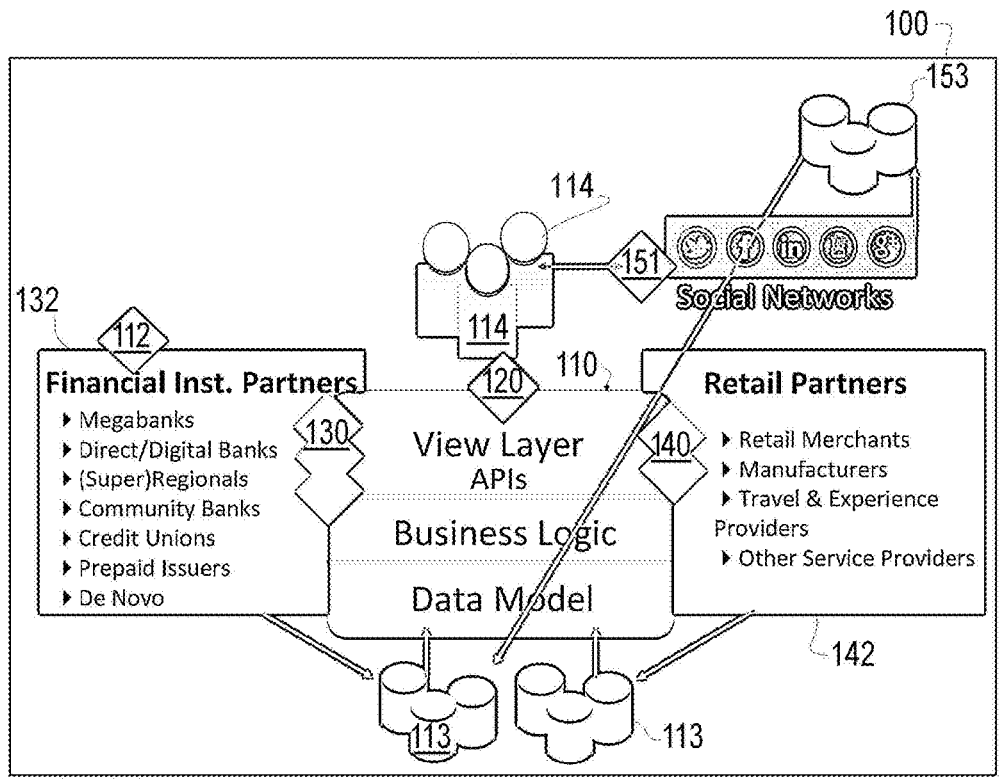
Figure 2C:
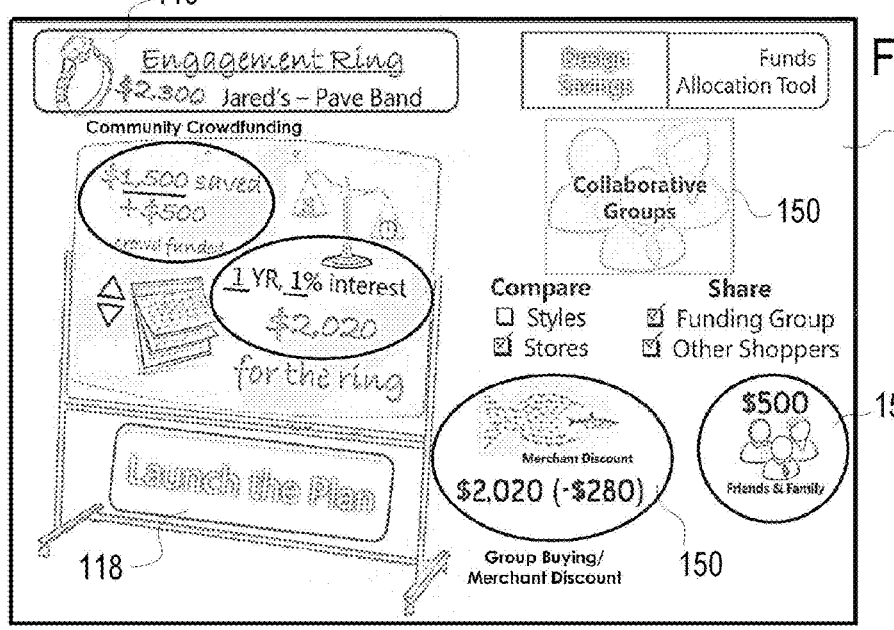

As noted above, FIGS. 2A-C are schematic representations of screen shots of an aspiration savings goal authoring tool 120 of the internet based user controlled aspirational savings social network system 100 of FIGS. 1C-D and the figures show a representative aspirational goal 116 (and engagement ring) for a user 114. As shown herein, the aspirational goal authoring tool 120 on the host electronic network platform 110 is accessible by the individual platform users 114 and generally will include at least one category of prospective aspirational goods and services 122 (Personal/Marital; Professional/Career) to assist the user 114. As shown in FIG. 2A the user's prior (including ongoing) projects may assist the user in defining a new aspiration and collaborative groups can also be a recourse for the user to shape and define an aspiration as well as assist in attaining the aspiration, such as through group purchasing.

As shown in FIG. 2B the tool 120 and categories 122 can help the user to "white board" their aspirations 116, and such visualization of aspirations is helpful to define a user's actual aspirations 116. The tool 120 is configured to assist individual platform users 114 in discovery and articulation of specific aspirational goals 116 to be assigned to each individual account 112 of the user 114, and assign at least an initial monetary goal amount associated with the individual account 112 based upon the specific aspirational goal 116 assigned to the account 112. Specifically after the user 114 identifies the general aspiration of an engagement ring the tool 120 engages in a user interactive social trade-off analysis between different goods and service to be associated with the aspirational goal 116, namely the tool 120 may guide the user 114 through a series of merchants 142 and ring styles there from until a ring is selected and an initial monetary goal can be identified and associated with the account 112. The tool 120 user interactive social trade-off analysis is also part of the savings plan 118 associated with the selected aspiration, for example the time needed to attain the goal of a selected ring given the user's recourses may require the user to adjust the goal 116 (or adjust the plan 118 by increasing savings contributions rate, and/or increasing savings amplification efforts such as by increasing the users 152 for crowdfunding, or electing to develop a comprehensive group for merchant discounts).

As shown in FIG. 2B, the tool 120 will also guide the user 114 through some of the collaborative savings amplifications aspects or tool 150 of the system which are configured to increase the effective monetary amounts in an individual account 112 to advance the savings plan 118 to the aspirational goal 116 above the principal contributions of the user 114. As discussed in the present application the collaborative savings amplification tool 150 of the system can include i) user controlled social network (151 or separate social network) based crowdfunding of a specific aspirational goal 116 assigned to one of an individual user's accounts 112; ii) gamification of individual accounts 112 from the financial institutions 132 or the merchants 142; iii) group purchasing discounts attributable to an individual user's accounts 112 wherein a group for group purchasing is formed by a collection of individual platform user's 114 having aligned aspirational goals (E.g., all seeking high end jewelry); iv) Reverse Auction from merchant; v) maximization of the interest for the individual and vi) content co-creation.

As noted herein in the system 100 the host electronic network platform 110 develops, modifies and monitors a savings plan 118 associated with each individual account 112 which can be illustrated to the user 114 in tool 120 as shown in FIG. 2C. Here the user 114 has selected a given aspirational goal 116 of a $2,300 engagement ring from a given merchant 142 and the plan 118 to achieve the goal includes $1,500 in user savings, $500 in user pre-approved crowd-funding from designated users 114 or 152, Interest of $20 over one year for the plan 118 and group buying or merchant discount accounting for $280 of effective money to reach the goal 116.

Figure 3A:
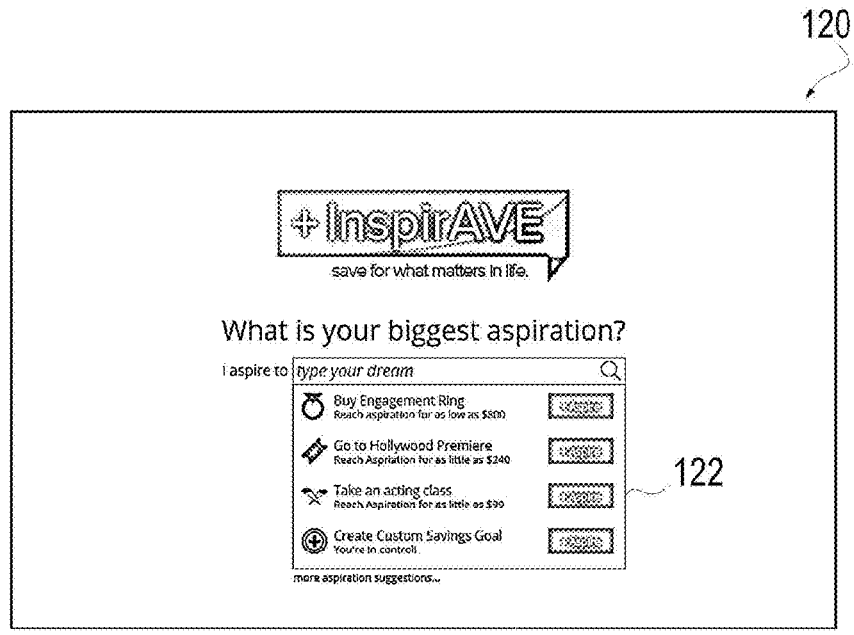

FIGS. 3A-F are schematic representations of screen shots of an alternative similer representative aspiration savings goal authoring tool 100 of the internet based user controlled aspirational savings social network system 100 of FIGS. 1C-D. As noted above the tool 120 is configured to assist individual platform users 114 in discovery and articulation of specific aspirational goals 116 to be assigned to each individual account 112 of the user 114, and assign at least an initial monetary goal amount associated with the individual account 112 based upon the specific aspirational goal 116 assigned to the account 112. As shown in FIG. 3A the tool 120 can include listings or categories 122 of prospective aspirational goods and services or conventional aspirations which can help the user to identify their specific aspirations 116, and such visualization of conventional aspirations is helpful to define a user's actual aspirations 116. It should be apparent that the system 100 can elaborate in greater detail on any given category of aspiration with merely the user clicking on the desired category. This aspect need not be further detailed.

Figure 3B:
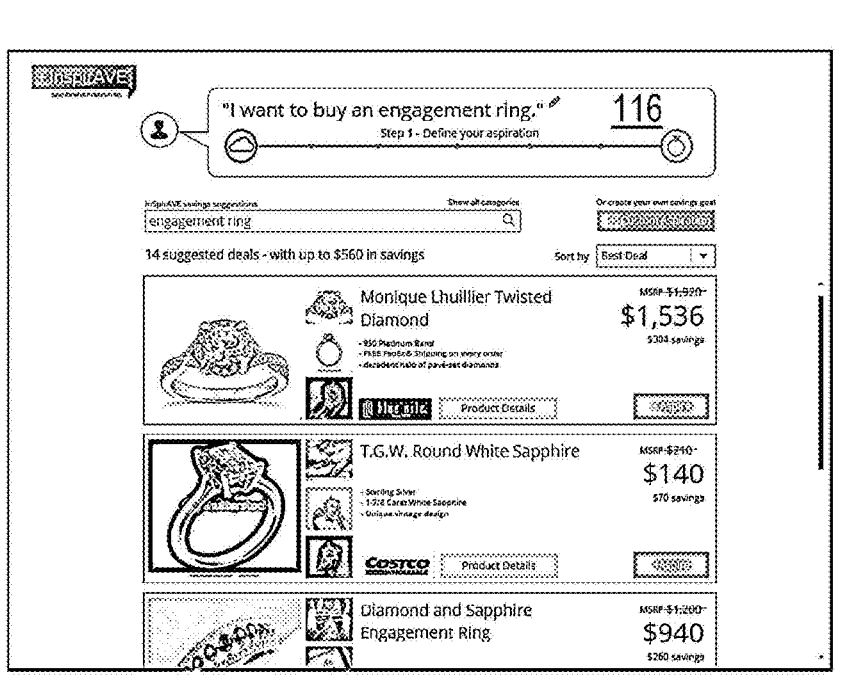

As noted above after the user 114 identifies the general aspiration of an engagement ring the tool 120 may guide the user through a series of merchants 142 and ring styles there from as shown in FIG. 3B with desired details, including user feedback being available to the user 114. The user 114 may have other users 114 or 152 provide input to help finalize a goal 116 such as voting for one of two desired rings, as shown in FIG. 3C. This feedback can also be considered as a part of the system amplification of savings tool 150 as the feedback from other users will help sharpen and often decrease the costs of a specific aspiration 116 (here the votes are leaning toward a $400 savings—in another example another user 114 or 152 may recommend a separate merchant with the same goods at a lower price—which will again advance the savings plan 118).

Figure 3D:

Once a goal is selected (e.g., a particular ring) then an initial monetary goal can be identified and associated with the account 112. As discussed, the tool 120 user interactive social trade-off analysis is also part of the savings plan 118 associated with the selected aspiration. FIG. 3D schematically represents the user 114 and system 100 interactions for developing a specific plan.

Figure 3E:
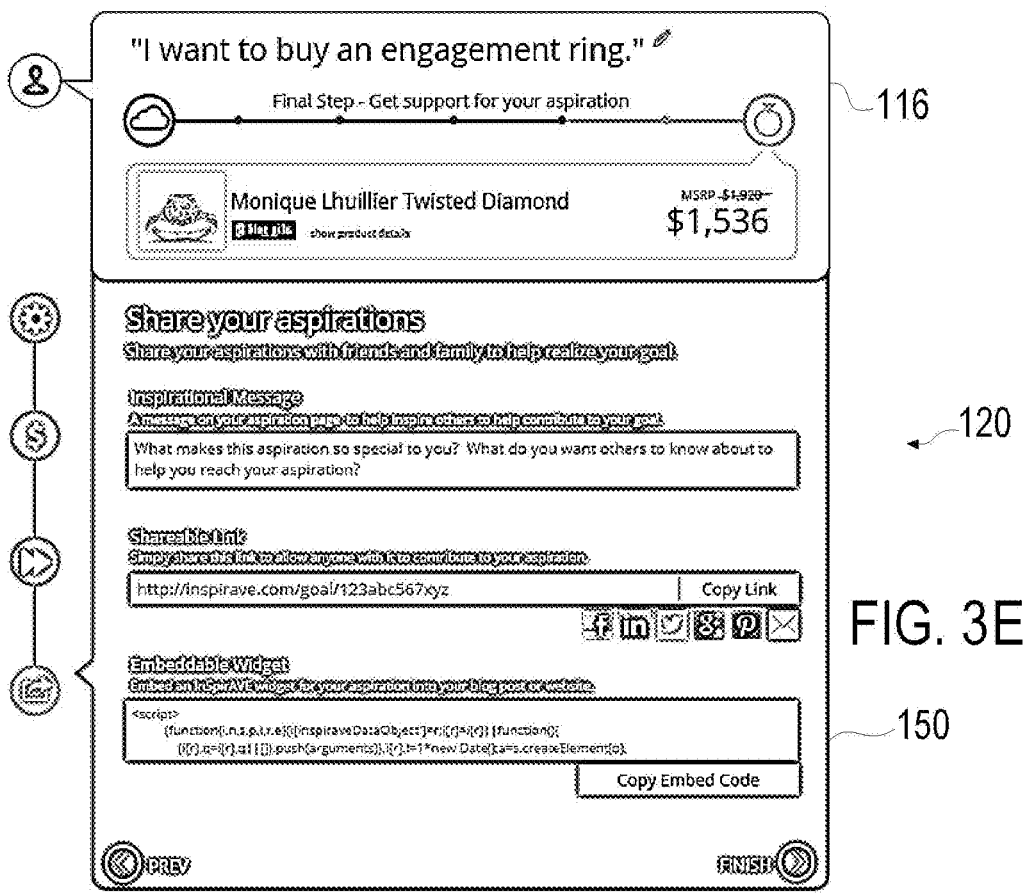

The tool 120 will also assist the user in amplification of the savings with tool 150 which can include i) user controlled social network (151 or separate social network) based crowdfunding of a specific aspirational goal 116 assigned to one of an individual user's accounts 112; ii) gamification of individual accounts 112 from the financial institutions 132 or the merchants 142; iii) group purchasing discounts attributable to an individual user's accounts 112 wherein a group for group purchasing is formed by a collection of individual platform user's 114 having aligned aspirational goals (E.g., all seeking high end jewelry); iv) reverse auction from merchant; v) maximization of the interest for the individual vi) content co-creation; and budgeting tools. FIG. 3E illustrate a representative screen the user 114 can encounter in promoting the user's aspiration 116 to an identified social network of users 152 or 114.

The tool 120 will monitor modify and update the users plan 118 and progress there on as shown in FIG. 3F. In FIG. 3F a relationship or friendship score 170 associated with this project is shown to help identify funding sources and sources of support, comment or the like. The scores for every project can be accumulated to show an individual's friendship or relationship score overall as discussed below in connection with FIG. 9.

Figure 8:
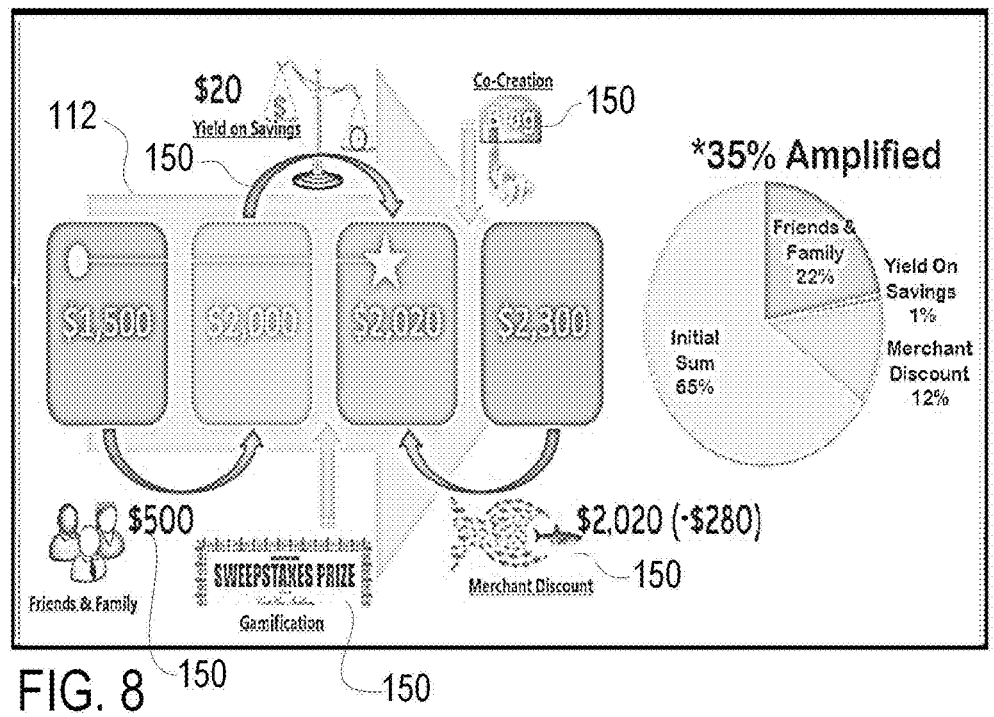
FIG. 8 is a schematic representation of savings amplification for a representative user aspiration using the internet based user controlled aspirational savings social network system according FIGS. 1C-D.

FIG. 8 is a schematic representation of savings amplification for a representative user aspiration 116 (the same as used in FIGS. 2 and 3 for comparison) using the internet based user controlled aspirational savings social network system 100 according FIG. 1C-D. As noted above the collaborative savings amplifications aspects or tool 150 of the system 100 is configured to increase the effective monetary amounts in an individual account 112 to advance the savings plan 118 to the aspirational goal 116 above the principal contributions of the user 114. As discussed in the present application the collaborative savings amplification tool 150 of the system can include i) user controlled social network (151 or separate social network) based crowdfunding of a specific aspirational goal 112 assigned to one of an individual user's accounts 112; ii) gamification of individual accounts 112 from the financial institutions 132 or the merchants 142; iii) group purchasing discounts attributable to an individual user's accounts 112 wherein a group for group purchasing is formed by a collection of individual platform user's 114 having aligned aspirational goals (E.g., all seeking high end jewelry); iv) reverse auction from merchant; v) maximization of the interest for the individual and vi) content co-creation. Some of these are partially illustrated in FIG. 8. Here the user 114 has selected a given aspirational goal 116 of a $2,300 engagement ring from a given merchant 142 and the plan 118 to achieve the goal includes $1,500 in user savings. The amplification of savings for this goal include $500 in user pre-approved crowdfunding from designated users 114 or 152, interest of $20 over one year for the plan 118 and group buying or merchant discount accounting for $280 of effective money to reach the goal 116.

The user controlled social network (151 or separate social network) based crowdfunding of a specific aspirational goal 112 assigned to one of an individual user's accounts 112 is described herein in detail and is illustrated as amplifying the users savings in the example of FIG. 8. It should be noted that the present invention is a "narrowcast" model in that it uses ONLY the users designated by the subject user 114 for crowdfunding purposes. Further, the "funding" may be feedback that is alternative to money that results in advancing the user 114 along his path.

Gamification of individual accounts 112 from the financial institutions 132 or the merchants 142 is another feature of the amplification tool 150 of the system 100. Gamification is generally known as the use of game thinking and game mechanics in non-game contexts to engage users in solving problems and increase users' self contributions. Gamification has been widely applied in marketing. Over 70% of Forbes Global 2000 companies surveyed in 2013 said they planned to use gamification for the purposes of marketing and customer retention. Gamification strategies often use rewards for players who accomplish desired tasks or competition to engage players. Here the system 100 is configured for sweepstakes type reward gamification systems and strategies to be utilized and implemented by the financial institutions 132 and/or the merchants 142 for amplification of savings. Additionally the system 100 is configured for gamification via users 114 (or 152) or groups of users 114 (or 152), such as via user sponsored games contests or challenges. In the example of FIG. 8 the gamification strategy is noted but it did not amplify the savings in this circumstance (e.g. the user 114 here did not win with this account).

Group purchasing discounts attributable to an individual user's accounts 112 wherein a group for group purchasing is formed by a collection of individual platform user's 114 having aligned aspirational goals (E.g., all seeking high end jewelry) is another amplification component of the tool 150 and is shown in connection with the example of FIG. 8. It is noted that such group buying may be user driven or merchant 142 driven as described further herein.

Another amplification component of the tool 150 is a reverse auction from merchant 142 who have access to the system 150 and the specific aspirations 116 of the users 114. Thus a merchant 142 (e.g., a jeweler) may approach a user with an offer for a specified good that is or aligns with the user's aspiration 116. Such offers will typically be below the general price of the goods and repetition of the process with multiple merchants 142 will tend to drive the price down.

Another amplification component of the tool 150 is maximization of the interest for the individual consideration of the offerings of one or more financial institutions 132 and optimizing the interest available to an individual user 114, which may include collecting or combining multiple user funds into a combined account (e.g., a "sweep account") to increase the yield for an individual. A relatively higher yield is shown in FIG. 8 than may currently be available for a short term savings of an individual. The collaboration of multiple users 114 on the same system 100 allows for effective maximization of the interest.

Figure 10:
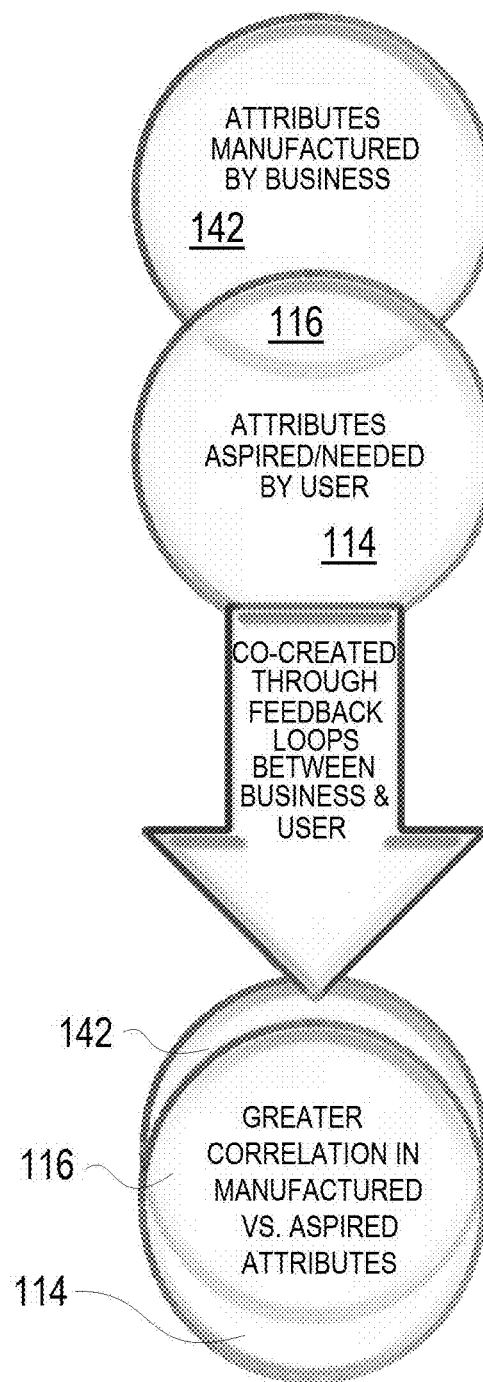
FIG. 10 is a schematic representation of content co-creation through collaboration of the users and the merchants.

Content co-creation is another amplification component of the tool 150 and is shown schematically in FIG. 8, however it does not "amplify" the user savings in this particular example. As described the system 100 promotes user customization of merchant products and/or user feedback to merchants 142 in a manner promoting merchant product modification at a macro or individual level. Content co-creation in the system 100 allows for consumer to business interaction and for customization of existing merchandize and for feedback to merchants 142 and to users 114, each of which is critically valuable to merchants 142, who may reward users 114 directly or through a gamification stratagem. Content co-creation is schematically illustrated in FIG. 10, in which the overlap between products available a merchant 142 and the user's goals (forming aspirations 116) is initially small but can be enlarged through a feedback collaborative process. Thus the system facilitates a co-creation of content forming user aspirations 116. The user created merchandize customization will drive newer versions of products and or product offerings. Merchants 142 will use information to modify, change or adjust products at the macro level or at the individual user level as appropriate.

User budgeting tools is another amplification component of tool 150 as the system 150 will allow the user 114 to better budget and use "discovered" savings to amplify savings toward their aspiration. Data analytics may be utilized to implement the budgeting tool. Conventional budgeting techniques and formats of existing budget development programs may be incorporated for this aspect of the tool 150.

Figure 4A:
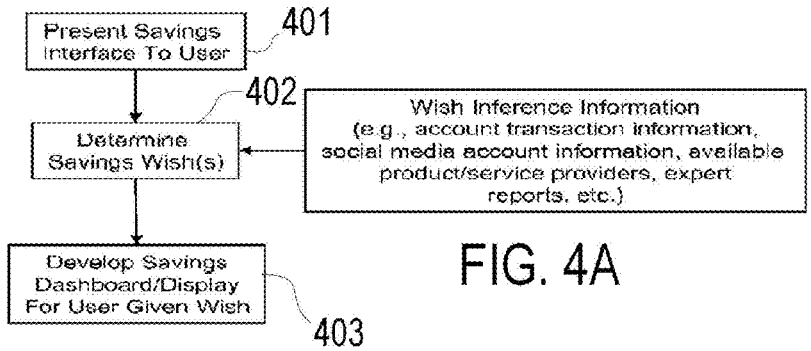
FIG. 4A-B illustrates an example method of incentivizing savings using a savings platform and facilitating collaboration between users with the internet based user controlled aspirational savings social network system of FIGS. 1C-D.

Referring to FIG. 4A, the system 100 may identify a savings wish or aspiration or goal 116 for a particular user 114 by accepting a user supplied savings wish 116 and/or by gathering input to derive or infer the user's savings wish 116, (e.g., from past transaction records, social media account content associated with the user, contacts of the user (within the savings platform or external accounts), etc.) For example, the system 100 may provide a platform, e.g., as for example hosted on a server 113, that is presented via an interface 120 at 401, e.g., via a web browser or downloadable application viewed on a client device. In the interface 120, a user 114 may provide, e.g., explicitly select, a savings wish 116 at 402. For example, a user 114 may select a savings wish 116 from among predetermined savings wishes, which in turn may be categorized 122, e.g., vacations, products, services, or the like. The user 114 may also identify a savings wish or aspiration 116 that is not listed in a predetermined format, e.g., via typing in or otherwise providing input to the interface 120 to indicate what is the savings aspiration 116. In the system 100, such information may be passed to an administrator or other user 114 connected to the savings platform 110 in order to provide specific assistance in identifying the saving user's aspiration 116.

In terms of a visualization that is presented to the various system participants, e.g., to a saving user 114, a user 114 will be provided with an organized presentation of the progress along a plan 118 towards achieving the wishes 116 or wishes 116 of the saving user 114. This may vary from user to user, e.g., among saving users, among different types of users 114 (e.g., individuals vs. merchants, e.g., the potential pool of saving users for a particular product, etc.), or the like. For example, a saving user 114 may receive an indication in the visualization and/or a notification, e.g., message provided to the saving user, regarding the progress towards a particular wish 116, the availability of the particular item, etc. A merchant 142 may similarly receive a visual, e.g., the available pool of savers 114 for a particular item, etc., in order to gauge if a particular item or service should be offered and/or to gauge the appropriate the pricing of the item, etc.

A user's savings aspiration 116 may be inferred and suggested to the user at 402, e.g., utilizing various data available regarding the user 114, e.g., past transactions or data retrieved from another of the user's accounts, e.g., financial accounts, social media accounts or the like. For example, a user 114 may opt-in to a wish inferring model and provide access to sources of information used in inferring wishes, e.g., social media accounts, history of transactions with merchants, web account histories, etc.

Figure 4B:
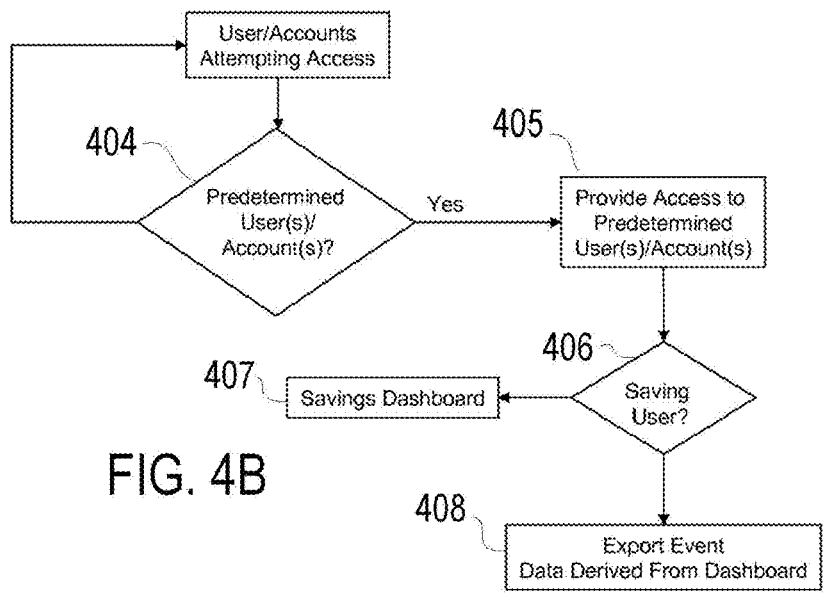

Users 114 may access the platform 110, e.g., if authorized as determined at 404 in FIG. 4B, and provide information that allows for spelling out or inferring an aspiration or wish 116. This may take place upon the user's first interaction with the platform 110, e.g., at 402 and/or may be refined or later determined, e.g., as the user 114 accesses his or her instance of the platform 110, e.g., in the form of a dashboard, as illustrated at 403, 406, 407 of FIG. 4B.

Referring back to FIG. 4A, the information provided by the user 114 and/or collected on the user's behalf is transformed by the platform 110 into a savings aspiration 116 and a specific plan 118 to achieve the same at 403. This may involve determining a savings plan 118 given the resources available, e.g., as determined via the information accessible to the platform 110 regarding the user 114, e.g., information regarding the user's resources or history thereof, regarding participating business entities (e.g., providers of goods/services), information regarding like users, e.g., as inferred based on characteristics of similar users in the system 100 and/or collaboration between users, etc.

User-specific items, i.e., connected to the aspirations 116 of the user 114, such as a product recommendation, then may be offered to the user 114 as part of the savings plan 118, e.g., via matching the user's wish 116 to products, services, etc. Again, this process may be repeated or refined over time utilizing Artificial Intelligence, Machine-Learning, etc. The savings platform 110 therefore matches specific products and/or services to the user 114 (e.g., in terms of best product/value for lowest cost/utilization of savings).

Part of developing a savings plan 118 and/or identifying a savings wish 116 generally includes identifying products and/or services available, as schematically shown in the sequence of FIGS. 2A-C and 3A-F. In this respect, the authoring tool 120 of platform 110 may facilitate arrangements with various merchants 142 of the system 100, e.g., merchants, product/service providers, etc., that make products and/or services available to the saving users 114. This information may be made available to the saving user 114 and/or to a wish inferring model of the tool 120 to assist in the formation of a specific wish or aspiration 116, e.g., given an input of a more general savings aspiration of a user 114.

Given the user's savings aspiration 116, specific products and/or services may be identified, e.g., according to participating merchants within the savings platform 110. The system 100 may also provide expert input, e.g., in the form of providing experts that conduct background work/research with product/services providers to assist the saving user 114 in establishing and/or refining a savings aspiration 116, in finding products/services matching the savings aspiration 116 once identified. This process may include experts transacting with merchants 142 (or prospective merchants 142) that are the product/service providers for products/services on the saving user's behalf or on behalf of a group of savings users 114.

Given an identified savings aspiration 116, the system provides an interface at 403, e.g., a savings dashboard or other display, e.g., for displaying the savings plan 118 including the savings required for completing or achieving the savings aspiration 116, for displaying savings progress in the form of stored savings account information, for displaying event report information (as further described herein), etc.

Part of developing this dashboard and display may include allowing the user 114 to pre-define or determine a specific set of social network users 152 (which themselves may be and likely are users 114 of the system) that may also have access to the savings account 112 information, including the savings aspiration 116, the progress in plan 118 made towards the savings wish, a sub-set of account information, etc. This facilitates collaboration among the saving user 114 and other users of the platform 110 and/or third parties.

The social network users 152 may also be users 114 of the system 100 with the system 100 forming an internal social network, or the social network users 152 may be separately identified and communicated with through other existing public (or private) social networks 151, such as FACEBOOK®, TWITTER®, LINKEDIN®, PINTEREST®, GOOGLE PLUS+®, TUMBLR®, INSTAGRAM®, VK™, FLICKR®, VINE™, MEETUP™, TAGGED™, ASK.FM™, MEETME™, and CLASSMATES™. The system 100 can interact with the servers 153 hosting other social networks in conventional fashion. The social network users 152 may be part of an informal network such as a group of friends/related users on the user's smart phone or e-mail service. The system 100 need only know the method of contacting the users 152, such as interfacing through well known social networks such as those listed above or e-mailing through contacts supplied by the user 114, or even incorporating conventional off-line mail delivery (sometimes called snail mail in the on-line environment).

The predetermined user or group of social network users 152 may also interact with the saving user 114 via the dashboard or an online instance of the savings platform 110, or through various social media 151 mechanisms. For example, the other social network user(s) 152 may leave comments or messages for the saving user 114 in the dashboard, on a social media 151 instance having information derived from the dashboard, etc. For example, other social network users 152 may encourage the saving user 114 towards the savings wish or aspiration 116, or through feedback prompt a change to the aspiration 116 resulting in modification of the plan. The predetermined group of social network users 152 may be defined by the user 114 creating the savings account 112. This display or dashboard may be accessible online or formed in a downloadable application that is populated with data from online account storage.

For example, the system 100 may provide a secure online interface or savings dashboard that may be accessed by other (pre-identified) social network users 152 associated with the user 114. Likewise, information derived from the dashboard may be accessible by the predetermined users 152 in another format, e.g., as presented in a web browser or downloadable application, in a social media feed, etc.

Referring again to FIG. 4B, secured access, e.g., facilitated by via social media account associations, may be provided by the system 100 at 404 in form of determining if a user or users (152 or 114) have been granted access to the dashboard and/or information derivable there from. For example, access may be provided to social media contacts of the saving user 114, e.g., friends, family, or the like.

Therefore, once a user 114 has established a savings wish or wishes 116, established an account 112 to which the wish 116 is associated, and has identified other social network users 152 (which may be separate users 114) that have been authorized by the user 114 may access and view information regarding the savings, e.g., progress (or lack thereof) along a savings plan 118. Such savings information of the saving user 114 may be provided to a predetermined social network user 152 having access to view the savings account information 112, as determined at 404. For example, a predetermined social network user 152 may be given access to the savings account 112 information (or a sub-set thereof) at 405. If the social network user 152 has not granted access, e.g., has not identified and approved by the associated user 114, then access is not permitted, and it is possible that the saving user 114 may be the sole individual having access to the savings information of account 112 (if he so desires). Note that the predetermination of a set of authorized social network users 152, the user 114 may be relatively open and authorize access to a wide range of social network users 152 (e.g. a user 114 such as the Rotary Club having a savings aspiration 116 of 1000 toys from a merchant 142 for distribution at Christmas and may authorize all users 152 of a number of social networks 151 to be the authorized social network users 152.

The system 100 may distinguish between the savings user 114 and other users 152 attempting to access the saving user's information at 406. This may include pushing savings user information to other users 152, e.g., according to a policy with respect to timing, the occurrence of a savings event, etc. Thus, if a user 114 or 152 is granted access at 405, it may be further determined if the user 114 or 152 is the savings user 142 or another predetermined user 152 at 406. If this is the savings user 114, the full savings dashboard and information contained therein may be accessible at 407, otherwise a subset of information may be made available at 408.

The system 100 may provide access to predetermined users 152 in a variety of ways. For example, as discussed above the system 100 may accept from the saving user 114 explicit indication(s) of which user(s) 152 are to be provided access to information of a specific savings account 112. Thus, the saving user 114 may provide input identifying one or more users 152, e.g., via entry of their user account information (e.g., email account information, social media account information, etc.). Moreover, a user 114 may identify one or more users 152 via entry of classifications of users 152 that are to be provided access to the savings account information. For example, an embodiment may provide input indicating that a certain circle of friends within a social media account are to be provided access, etc. Such access provided to additional users 152 may include various levels of privilege granted to such users 152 to "View", "Comment", or "Edit" as part of Collaboration to achieve the Savings Aspiration 116, Wish, or Goal. The system 100 may provide that users 152 with a select level of privileges (e.g., "Edit" privileges) may be able to make monetary or in-kind contributions to accelerate the fulfillment of the savings aspiration/wish/goal.

Alternatively, the system 100 may automatically determine user(s) 152 that are to be provided access to the savings account information, which set is approved or acknowledged by the user 114. For example, an embodiment may infer that the savings user 114 is closely associated with another user or users 114, e.g., via association of social media accounts (for example, using the saving user's social media contacts), via association of cloud based accounts (financial, social or other types of accounts), via a collaborative relationship within the savings platform 110, etc. Thus, the system 100 may automatically determine which user(s) 152 have access to the savings account information of the user 114. Such automated determination may be suggested to the saving user 114 for approval of the automatic determination, but need not necessarily be suggested and/or approved by the savings user 114, as they could be provided to be automatic unless restricted by the user 114 (i.e. an implicit authorization of the users 152).

Figure 5:
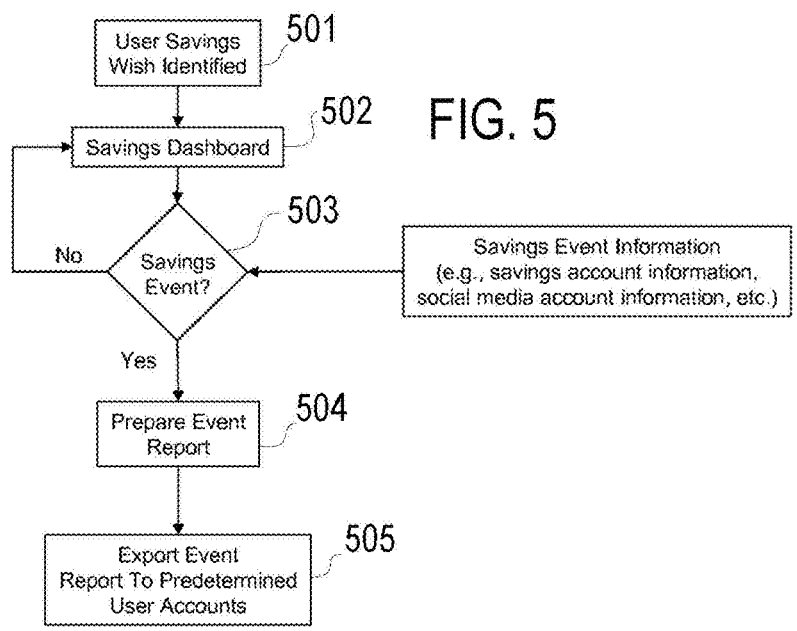
FIG. 5 illustrates an example method of using communications functionality of a platform to allow various users to collaborate with the internet based user controlled aspirational savings social network system of FIGS. 1C-D.

By way of example, referring to FIG. 5, for a user 114 that wants to save for a wish 116 of sending his or her children to a particular school, to save for a particular vacation, or the like, the user 114 may create a savings account 112 with the wish(s) 116 in mind that is/are identified (e.g., explicitly using user input and/or inferred) at 501. For example, a user 114 may provide inputs and/or data may be accessed from which inferences may be made such that an embodiment may identify what the savings wish 116 is, i.e., what the user 114 is saving for and thus which aspiration 116 is to be assigned with the individual account 112.

Given the identified wish 116 (which may be more than one wish to form a combine aspiration), a dashboard may developed and/or refined at 502, including in one example a feature of permitting access to other users 152, e.g., friends, family, etc., of the saving user 114, such that these other users 152 may have access to reason(s) or wish(s) 116 for saving in the account 112. In addition to providing the predetermined user(s) 152 with access to the reason(s) or wish(s) 116 for saving, e.g., at 505, the system 100 may provide event reports to the saving user 114 and/or the predetermined user(s) 152 or subsets thereof. These event reports may be the same or different depending on the user(s) 114 or 152 (or subset thereof) to which it is provided, e.g., according to predetermined permissions, for example established when the saving user 114 creates the savings account 112, thereafter, or as periodically or frequently updated, etc.

In the illustrated example of FIG. 5, the system 100 may determine a savings event has occurred at 503. For example, the saving user 114 may deposit money to the savings account 112 as determined at 503, which may be part of plan 118. Similarly, an important event may come to pass, e.g., ½ of the monetary goal of the savings wish 116 has been reached. Another non-limiting example of a savings events may include a calendar date of importance has been reached, e.g., one year since savings were started, three weeks without adding to the savings account, two weeks until a wish or milestone is achieved, etc.

If a savings event has occurred, as determined at 503, the system may prepare an event report at 504. For example, the system 100 may prepare a summary event report at 504 which is delivered to the predetermined user(s) 152 or subsets thereof and/or user 114, e.g., via social media feed. As a specific example, if the savings event determined at 503 is the user 114 exceeding a threshold amount of savings, e.g., ⅓ of the savings required to achieve the wish 116, a summary report may be prepared at 504 in the form of a TWITTER® social media 151 account message stating that "{User A} is only ⅔ away from vacationing in Hawaii". This message may be provided by an embodiment at 505 to the predetermined user(s) 152, e.g., to the saving user's followers on his or her TWITTER® social media account.

Thus, for a user 114 having developed a savings account 112 with the wish 116 of saving for a vacation, and having identified user(s) 152 that are permitted access to the savings account 112 information (or subset thereof), information derived from the savings account may be provided to the predetermined users 152 in a variety of ways. For example, a social media 151 feed may be provided to the predetermined user(s) 152 account(s) having savings account information therein. Thus, the predetermined user(s) 152 may be apprised of the savings wishes 116 of the user 114 and/or the saving user's progress (or lack thereof) in the plan 118 toward achieving the savings wish(s) 116.

The system allows users 114 (individual users and/or business users) to collaborate in an interactive economy created by the savings platform 110 such that consumer-to-consumer interactions, business-to-consumer interactions, consumer-to-business interactions, and business-to-business interactions are facilitated. Savings, or effective monetary amounts as noted above and as used herein, may refer to actual monetary savings and also may refer to savings realized via reduced cost, improved efficiency, etc.

At a macro-level, savings in an individual account 112 may be considered the savings (e.g., cost reduction) for a group or for an entire ecosystem, e.g., an entire community. At a micro-level, individual users 114 of the platform 110 may save in terms of reduced cost of items, increased efficiency, etc. Savings, as further elaborated on herein, is more than the simple difference between disposable incomes less consumption. Rather, savings is more inclusive and reflects a broader definition including but not limited to (1) holdings directed towards merchandise as part of periodic/day-to-day consumption, and (2) holdings in addition to "disposable income" (e.g., inherited wealth, lottery winnings, etc.). The system joins similar users 114 together for collaboration. Users 114 may be associated with one another based on some metric or dimension, e.g., similar wish or aspiration 116. Thus, users 116 may collaborate with one another in various ways. These users, for example, may work together to achieve a common wish, e.g., a co-ownership arrangement. Therefore, the system 100 facilitates users identifying one another and working together to intelligently manage their savings. The system 100 facilitates creation of an "Internet-of-Savings", i.e., connecting the ecosystem of "savings" to the ecosystem of products/services/experiences of value; i.e., connecting savings to aspirations resulting in greater purpose. In so doing, the system 100 inspires and influences elevated savings.

Co-ownership may be further elaborated with an example. Consider where user 114 (Jack) is saving to buy a Tesla (aspiration 116) and another collaborative user 114 (Jill) contributes towards that goal, she may invoke the option to have access to the vehicle (once bought): this access could be provided unobtrusively to maximize utilization by both primary & secondary 'owners', or, otherwise: e.g., Jill's access during periods when Jack is not using the vehicle, or, Jack+Jill both sharing a road-trip/commute-into-work; Several other use-cases and permutations should be included in the scope of the patent such as shared vacation/hotel-stays, etc. with the Saver having the option to prefer contributions of contributors that do NOT request shared/partial ownership over those that do [e.g., if Jill and Joan both contribute, Jack may have the option of accepting Joan and rejecting Jill's contribution b/c of the latter's request for partial ownership; Variants may include—but not limited to—instances where a certain level of contribution is needed to extend the ask for partial ownership [e.g, if the threshold for ownership is contributing at least 50% of the savings goal, Jack may ask Jill to reduce her contribution to 49% at which time he will accept the contribution].

The system 100 reduces the complexity and information overload in the savings process (e.g., visual/product-design constructs are provided that shows progress towards fulfillment of aspirations rather than overwhelming a consumer/saving user with the jargon of interest rates, APYs, etc., that often have no emotional resonance or purpose associated with them). The system further provides trusted guidance and deployment of back-end data/analytics/algorithms to provide a recipe, etc. (e.g., principal and timeline needed to achieve savings aspirations which are within the user's means). This may include providing advising and counseling, e.g., if an aspiration 116 identified by the user is otherwise is not practical for the user 114

The system 100 facilitates users collaborating to attain "savings" aspirations 116 including those that would otherwise hitherto have not have been possible without: a) collaboration/support (e.g., by engaging other designated users/friends/family/financial counselors/product and service and experience subject-matter experts); b) benefiting from the scale and the efficiency that the two connected ecosystems (i.e., savings and products/services/experiences) creates to deliver the highest value at the lowest cost. The system 100 therefore stimulates greater and more thoughtful consumption by tying together various users, experience advisors, and ecosystems.

The system 100 provides feedback loops and mechanisms among the various collaborators (users 114, 152, and merchants 142 and even the financial institutions 132. With feedback loops and both micro- and macro-signals between saver/user 114 and merchant 142 (provider/producer/manufacturer) of products/goods/services, the system 100 results in elevated experience and elevated productization/design/innovation.

Figure 9:
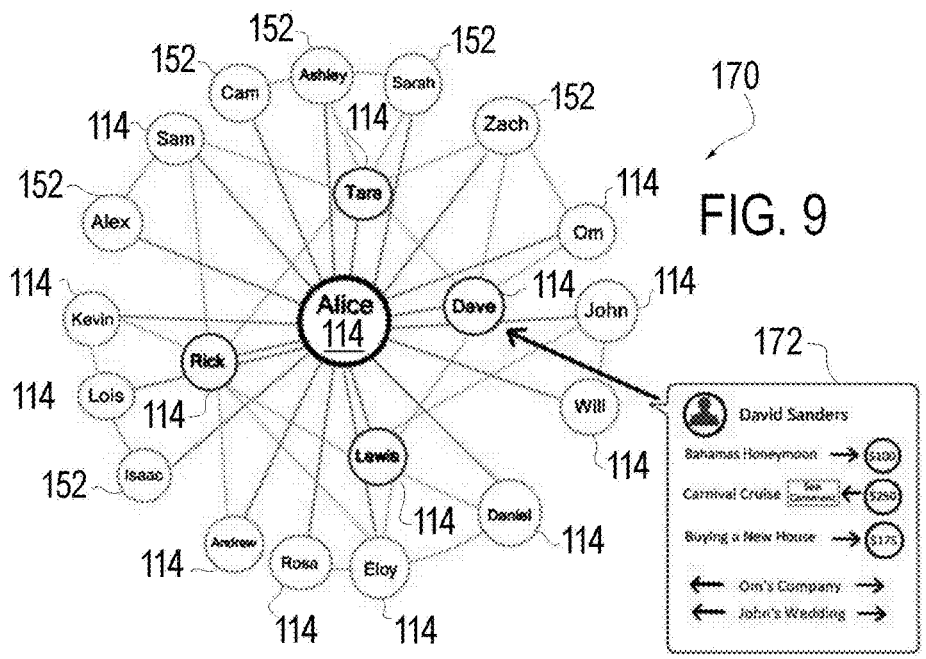
FIG. 9 is a schematic representation of a friendship or relationship scoring system for the internet based user controlled aspirational savings social network system according FIGS. 1C-D.

FIG. 9 is a schematic representation of a friendship or relationship scoring system 170 (or relationship score 170) for the internet based user controlled aspirational savings social network system 100 according FIG. 1C-D. Essentially for every user 114 (Alice in the example) who has engaged in a project (or aspiration 116) of their own or interacted with another user on the system 100 the interactions of the collaborators 114 (and 152) are maintained and quantified. A relationship score 170 of every other user 114 or 152 thus associated with the specific user 114 Alice can be developed that is based upon the relative interactions between the related users. For example for user Dave there is a record 172 of two contributions to Dave's projects from user 114 Alice and receipt of one contribution to one of Alice's project and the two both were associated commonly with two other users' projects. The higher the level of interaction the higher the score and the relative scores are shown visibly through an inverse relationship of the distance from the given user 114 (Alice). In other words in the graphic representation, higher that an individual's score 170 (for that user 114) is than the closer the user icon is shown relative to the user 114. The scoring system 170 can also appropriately identify and account for "one sided" relationships (i.e. where one party is always funding and commenting and assisting in the aspirations 116 of the other with no reciprocation or vice versa). The relationship scoring system 170 can be helpful in user's maintaining an effective aspirational savings social network within system 100. The relationship scoring system 170 is applied to every project associated with an account 112 (and aspiration 116), as shown in FIG. 3F, and the collection of these project relationship scores 170 involving a user 114 form the individual total relationship score 170 as shown in FIG. 9.

The system 100 results in a reduction/substitution of the need to lend via commercial institutions (such as some of the financial institutions 132), namely by tracking contributions from the specific social network users 114 (and to a lesser extent 152) over time; through system 170 implemented on the platform 110 the system 100 may codify or designate such contributions as IOUs or equivalents. Thus the system 100 urges a user 114, Jack, to (in)voluntarily contribute to a collaborative user 114, Jill's savings goal 116 (based on "IOU" from Jill's support of Jack's previous savings goal). Should Jack decline, such behavior may potentially adversely impact Jack's Relationship Score 170. In principal such relationship scores 170 could serve as proxies for creditworthiness—or worthiness to receive support for savings goals. In this example, the reduced relationship score 170 may diminish Jack's standing within his 'network' to receive contributions for his own future 'savings' goals 116.

Consumer-to-Consumer Interactions

The system 100 facilitates consumer-to-consumer interactions via a savings platform. The system 100 accesses saving users' information as noted in FIG. 6 at 601 in an effort to identify like users 114 within the savings platform 110. For example, an embodiment may determine at 602 that two or more savings users 114 are alike given similar aspirations or wishes 116 between the users 114. Moreover, system 110 allows users 114 to explicitly identify other users 114 that are to be considered similar and thus suitable for collaboration, e.g., consumer-to-consumer collaboration. In an embodiment, the like users 114 may be identified at 602 based on an inference of user wishes 116 and similarity between the users' wishes 116. This may be based on, for example, explicitly provided user wish information, account transaction information of the users 114, social media account information of the users 114, similarity between requested goods/services among the users 114, expert reports categorizing the users 114 based on various characteristics, etc.

A user 114 may have a profile, e.g., including demographic information, etc. This profile may be accessible to other users 114 that want to collaborate, e.g., co-located users 114 identified by the user devices (e.g., via short-range wireless mesh networking and/or via intermediary, e.g., internet connectivity). This may be controlled by the users 114, e.g., opting in or out of sharing or collaborating, and/or temporarily opting in and out of collaboration scenarios at various times. This collaboration facilitated via similarity metrics, e.g., derived from a user profile, and may facilitate communications in real time between the users.

If users 114 are determined to be alike and thus suitable for collaboration, e.g., consumer-to-consumer collaboration, the system 100 may facilitate communication and thus collaboration there-between. For example, an embodiment may automatically provide an indication of the like user's existence within the platform 110 to another user at 603 (noting that the platform 110 may be distributed among the user devices and/or centrally hosted or supported or curated). Consumer-to-consumer collaboration may thus be facilitated by the savings platform 110. As an example, users 114 may be identified as alike, e.g., explicitly by having the users identify one another or share particular information and/or implicitly, such as based on similarities between savings platform behavior, e.g., transaction behaviors, etc. Thus, an embodiment may determine users 114 are alike at 603 and capture life-event/aspirations and the financial objectives, e.g., in the form of a savings plan 118, that will enable the like users 114 work towards achieving these wishes 116 in a collaborative fashion. For example, savings plans 118, financial consulting/advising, etc., may be geared towards a group of like users 114. In an example, a communication may be provided, e.g., at 603, to a like user 114 identifying another user's wishes 116. This communication may therefore facilitate the receiving user 114 to participate/collaborate in the other user's savings plan 118. For example, the user 114 receiving the communication identifying the like user 114 may be provided access to the other user's account information of account 112 or wishes 116 (or information derived there from) such that the like user 114 may be familiarized with the other user's aspirations 116. This may for example be used to alert a friend or family member of the like user 114 of his or her aspirations 116. The users 114 may then collaborate to achieve the particular wish or aspiration 116. By way of example, a network of friends/family/others (users 152) may contribute to a particular user's savings account 112, e.g., the form of cash or other contribution, such that the saving user 114 may be assisted in achieving the particular savings wish or aspiration.

Saving users 114 may thus explicitly or implicitly (e.g., based on transaction behaviors, social media account information, etc.) have life-event/aspirations determined, e.g., as outlined in FIGS. 4A-B. Given these determinations, an embodiment may formulate the financial objectives/savings wishes 116 that will enable the saving users 114 to accomplish these wishes 116 in a collaborative way, e.g., based on a similarity determination as outlined in FIG. 6. For example, the system 100 may infer that a saving user 114 wishes to be married and have a wedding reception at a particular venue, e.g., as derived from access to the saving user's web browsing history, social media account, or as explicitly identified by the savings user 114. The system 100 may determine various mechanisms by which the saving user 114 may accomplish the wishes 116 as facilitated by collaborative efforts. For example, given the ability to find like users 114 within the savings platform 110, the various users 114 may work together to achieve a common wish 116, e.g., a network of friends/family/others (namely users 152) may contribute to a particular user's savings account 112, e.g., the form of cash or other contribution, such that the saving user 114 may be assisted in achieving the particular savings wish or aspiration 116 such as securing a particular wedding venue.

Other collaborations are of course possible, e.g., purchasing of items as a group from a particular merchant and achieving a group discount, comparing notes and experiences with achieving a particular wish or interacting with a particular merchant 142, making shared travel plans, etc. Accordingly, like-minded users 114 that have wishes 116 aligned with one another in some way may be connected, e.g., in real time or over a longer period of time to achieve a long term wish.

As another illustrative example, in the case of travel and lodging, users 114 (e.g., saving users) may communicate explicitly via the dashboard or implicitly (e.g., via event reports made on a saving user's behalf to other savings users 114, e.g., based on geo-location, like wishes, social media contacts, etc.) in order to facilitate saving users 114 working together to achieve common wish(s) 116. For example, saving users 114 going to the same travel destination at the same time may connect with one another, e.g., via dashboard communication, to compare notes, make shared travel/vacation plans, request value items (e.g., services, products, etc.) as a group, etc.

Business-to-Consumer Interactions

In a similar fashion, the system 100 may facilitate business-to-consumer (saving user) communication and agreement formation. For example, in the process outlined in FIG. 7, merchants 142 (e.g., merchants providing value items) may be given access to information regarding saving user wishes (e.g., statistics regarding a number of saving users that have identified various wishes, how much these saving users have saved, for how long, etc.), e.g., in the form of an event report, and be offered an opportunity to proactively offer value items to the saving users or groups thereof. This is facilitated by the system 100 identifying like users at 701 and associating various value items offered by merchant 142 with the wishes of these like users at 702. The system 100 may identify the providers of these value items at (603 of FIG. 6) such that a connection (e.g. 703) may be made between the various like user groups and the providers of goods/services associated with the wishes/aspirations of these users.

Thus, business may be users of the savings platform in a sense that they may access the system and participate therein. The system 100 provides an opportunity for businesses to leverage scale for selling of value item inventory to saving users, again in advance and typically at a discount. Thus, according to an embodiment, value item merchants may bid or offer value items (e.g., goods, services, etc.) for explicitly and/or implicitly determined needs of saving users for particular value items. If an agreement is made, e.g., between like users and a merchant, as determined at 604, the parameters of the agreement may be compiled in an event report at 605 and provided to the various participants, e.g., like users and merchants, at 606. Therefore, an embodiment facilitates agreement formation, e.g., group purchasing of items or services at a discount from merchants.

Consumer-to-Business Interactions

Figure 6:
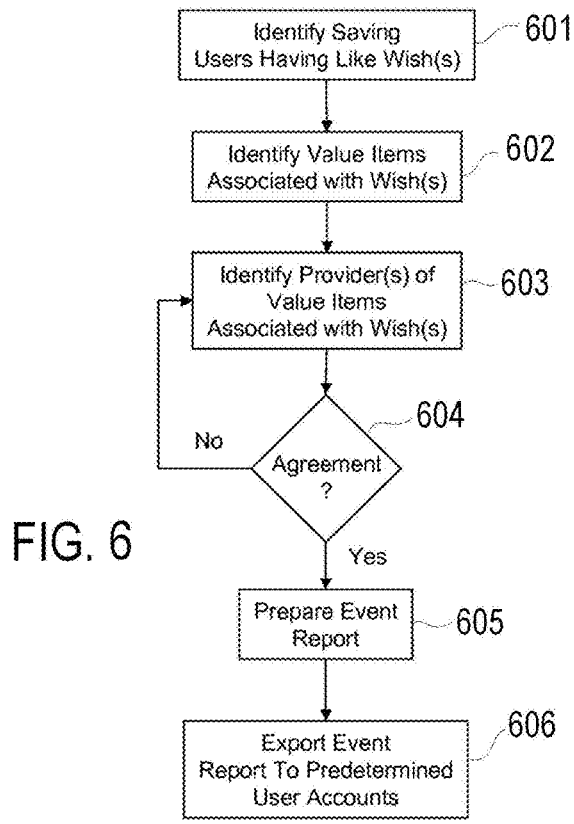
FIG. 6 illustrates an example method of facilitating collaboration between various users and reporting thereof via a platform with the internet based user controlled aspirational savings social network system of FIGS. 1C-D.
Figure 7:
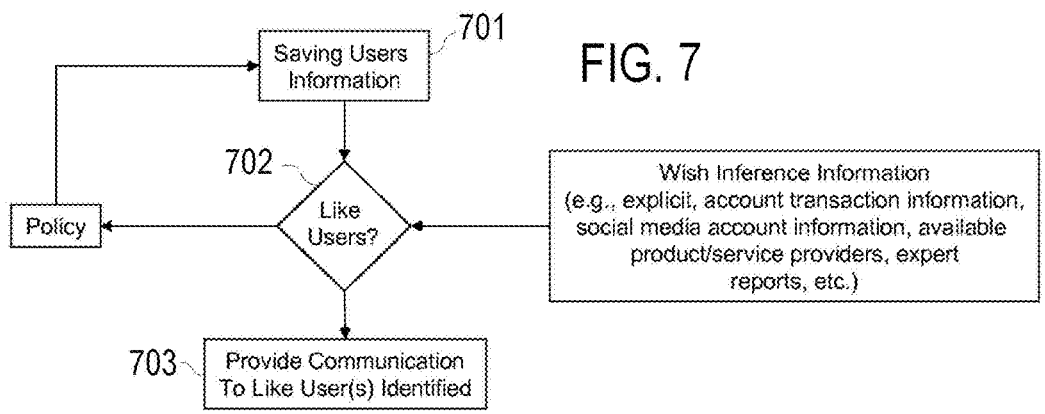
FIG. 7 illustrates an example method of identifying like users and facilitating communication there-between using a platform with the internet based user controlled aspirational savings social network system of FIGS. 1C-D.

As an extension of the sharing/collaboration economy and value-exchange, e.g., as outlined in connection with FIG. 6, an embodiment may create a sharing/collaboration platform by which various entities (e.g., saving users, businesses interacting with the savings users, etc.) may collaborate to accomplish various wishes linked to the saving user(s) and their wishes.

In an embodiment, communication, either direct or indirect, may be facilitated between saving users and businesses given the above described mechanisms for making improvements. For example, saving users may communicate directly or via an intermediary (e.g., a host service providing the savings dashboard) to provide feedback to businesses in ways that enable incremental improvements to how value items (e.g., products/services/experiences) are provided, as well as breakthrough consumer-designed innovations to these processes, products, services, or experiences.

For example, value item merchants may adjust pricing, timing, type or content of value items offered, or even determine new value items to offer, e.g., on the basis of feedback from various saving users. By way of example, an embodiment may provide a business with feedback that, having an offer for a value item (e.g., discount travel accommodations), only thirty percent of the saving user's identified, e.g., at 601 of FIG. 6, opted to "purchase" or save towards the discount travel accommodations, e.g., via formation of an agreement at 604.

This may in turn be supplemented with additional feedback, e.g., derived from communication with the saving users, as to the reasons why (e.g., not offered soon enough, not the correct price, not the type of accommodations needed or desired). All such information may be utilized by the businesses and/or the savings interface provider to refine the value items offered, the timing of offers, the pricing of offers, the discovery and articulation of savings wishes, etc.

Therefore, an embodiment may utilize positive and/or negative signals or trends derived from the platform or dashboards of various savings users (e.g., demand for specific merchandise and/or top sources of customer satisfaction/dissatisfaction, etc.) to change, modify, or optimize operations, even in other channels (e.g., inventory/assortment of merchandise in brick and mortar retail stores, other online offerings, etc.). These signals or trends may take place at the macro-level, e.g., a group of users 114, and/or at an individual level. An embodiment therefor provides a mechanism for feedback to businesses in ways that enable incremental improvements to their products/services as well as breakthrough consumer-designed innovations.

The system may utilize both positive and negative signal from the platform to improve services/products from top sources of customer satisfaction or dissatisfaction. Such trend data, e.g., derived from groups of like users 114 and their behaviors in the platforms (e.g., purchases, refusals to purchase, etc.) may be utilized to identify demand for specific merchandise/services such that businesses may be apprised of such trend information, e.g., via report provided by an embodiment at 605, to change or optimize operations in other channels such as inventory/assortment/supply chain of merchandise in stores and/or offerings made via the platform.

Business-to-Business Interactions

An embodiment may likewise facilitate business-to-business collaboration in a similar way as business to consumer/saving users are facilitated. For example, large enterprises serving small/mid-sized businesses (SMB) may utilize similar collaboration and feedback mechanisms (i.e., used to construct to business-to-consumer collaborations/interactions) in an effort to facilitate and/or improve large to SMB business dealings. Collaboration in-between SMBs similarly may be accomplished in this regard. That is, the "savings users" may not be individuals but rather business users (large or small/medium), and the savings wishes may be business wishes, e.g., "savings" translated into other forms of savings relevant to a business, e.g., increased efficiency, improved pricing models, better supply chain management, etc.

For example, savings wishes of a business may represent wishes of a particular business cycle, e.g., tied to cash flow needs. Likewise, collaboration between large enterprises may utilize such information and collaboration in a suitable modification of the above. For example, in the context of business organizations sharing best practices rather than or as a form of savings wishes amongst each other, an embodiment facilitates identification of alliances (i.e., saving users having similar wishes), formation of deals or agreements, e.g., merger and acquisition targets as value items, etc. In this regard, for business users of the platform collaborating with one another, businesses may exchange needed services with one another as the form of collaboration via the platform rather than, e.g., individual users purchasing products or services from merchants. As an example, a business user may be informed, based on that businesses wishes, e.g., need for financial services, with another business user, e.g., another business entity offering such financial services. Similarly, feedback statistics, trends and communications may be provided to the offering business entities, similar to the trends and feedback data provided with respect to the savings users.

In this regard, business-to-business collaboration may include collaboration between corporate officers, i.e., as users having identifiable wishes such as business cycles and associated needs, may be associated with one another as facilitated by the platform. These users may be, e.g., identified to one another such that they may collaborate to achieve aligned wishes such as exchanging information on best practices, form business relationships/alliances, enter into deals, identify merger or acquisition targets, etc.

Thus, the system 100 facilitates a paradigm shift in bringing various users and entities together in terms of achieving wishes. The system 100 described herein place the focus on the actual, underlying wish of why particular users (including personal users and business users, or both) place money into savings accounts, enter into business relationships, offer or purchase particular products or services, etc.

Whiteboard Systems and Methods

The whiteboard system 120 and associated methods were discussed above in connection with system 100, but there are further aspects of the whiteboard system 120 and methods that are within the scope of the present invention. The whiteboard system 120 may be used to facilitate savings and alternative use of savings. Certain techniques regarding this topic were outlined above. Returning to the whiteboard 120, many people save with a particular wish in mind but do not have the knowledge or a place in which this wish may be nurtured to fruition. Many people find that, while they have certain wishes, goals or aspirations, these go largely unfulfilled. Many of these wishes, goals and aspirations are associated in some way with financial considerations.

While certain institutions, e.g., banks, insurance companies, lenders, etc., tend to match select aspirations of users with like products, these tend to only be in-house offerings. For example, an insurance company may match a particular product, e.g., whole life insurance, with a particular user wish or aspiration in mind, i.e., wealth transfer to a future generation. However, such arrangements are limited in several important respects such that they cannot be considered to match savings to a person's aspirations. First of all, such conventional savings vehicles tend to have a singular and inflexible focus. Thus, a life insurance policy does not change with time in the sense that it always is aimed at achieving the same wish. Moreover, these products are customized, in-house offerings of the financial institution or company and cannot be matched to other wishes of a user. Still further, the limited amount of these products tends to categorize users into a small amount of discrete groups, where the products do not end up matching the user's aspirations. Finally, these products all tend to focus on long term wishes rather than more short term wishes.

The present invention incentivizes users 114 to save by associating a user's savings 112 with a "greater" purpose or reason (goal 116) to save or secure financing. This more closely ties the offerings available to the personality and aspirations of the user 114. Furthermore, embodiments focus on short or mid-term wishes 116 and allow a user 114 to update or modify the plan 118 as the user's aspirations change. Additionally, the invention allows the user's wishes 116 to be matched with savings and lending opportunities that are connected to third parties (e.g., vendors 142, and social network users 152), not merely products offered by a particular financial intuition 132 or group of related companies. The whiteboard 120 of the present invention furthermore permits various parties (related users 114, social network users 152, domain expert from vendors 142 or financial institutions 142) to collaborate via an interactive framework via the whiteboard platform 120. The system 100 therefore implements a whiteboard platform 120 that various parties (users 114, social network users 152, and domain experts from vendors 142 or financial institutions 132) may access and interact with in order to facilitate savings 112 of a specific user 114 for a given aspiration 116. The system 100 directly ties products/services to user's savings 112 and/or ability to save or secure financing as well as the user's desires or aspirations or wishes or goals 116. Therefore, the system 100 ties together user's savings 112 (current and in the future) or lending with the Internet of Things, including the ecosystem of products, services, and experiences available or catalogued online as well as those that are offline and the merchants or service-providers that provide, produce, or manufacture them. In other words, the system 100 creates an "Internet of Savings" tying the users' savings 112—and at a Macro level the "Savings Ecosystem" comprising of a plurality of users 114 who are all "saving"—with the "Provider Ecosystem" of products, services, and experiences and the merchants or service-providers 142 that provide, produce, or manufacture them. Thus, at a Macro-level, the system 100 creates a pool of savings that can be linked to merchants and service providers 142 offering goods/services. Moreover, saving users 114 are provided with the ability to leverage this pool of savings to take advantage of scale in making purchases of goods and services from vendors 112.

The system 100 provides a whiteboard platform 120, e.g., implemented in an electronic device as an automated or semi-automated tool, such as by using the system architecture outlined, which assists users 114 in identifying wishes, goals and aspirations 116. In this process, an embodiment may facilitate identification of wishes, goals and aspirations 116 via an interactive assessment tool as part of platform 120 that guides a user 114 through a process of identifying his or her wishes, goals and aspirations, e.g., via use of predetermined questions presented via a user interface. The system 100 allows a plan or plans 118 to be developed regarding these wishes, goals or aspirations 116, e.g., such that a user 114 is not only enabled to identify and articulate his wishes, goals and aspirations 116, but is also assisted in achieving the same with provisioning of a personalized plan or plans 118. This may leverage pre-existing assessment tools, techniques and questions, such as outlined in Hemmasi et al., "Work Goals and Life Aspirations: Do you have what it takes to be an Entrepreneur, Developments" in Business Simulation & Experiential Learning, Volume 27 (2000), incorporated by reference herein. These questions may be presented sequentially and dynamically updated on information available to the whiteboard system 120, e.g., via accessing previously answered questions, accessing historical data regarding the user 114 (e.g., inferred interests represented in transactions, web browsing, social media activity, etc.) and the like.

This process of identification of wishes, goals and aspirations 116 and development of plans 118 regarding the same may include presentation of questions or activities to the user 114 that are generally designed to elicit responses from a user 114 in order to refine broader categories 122 of possible wishes, goals and aspirations 116, and that allow a plan 118 to be refined, expanded or modified as necessary. User input may form a more basic starting point for developing a specific goal or aspiration 116 of the user, for example a user 114 may take a camera phone shot, online screenshot of a desired object, like a car, and this image uploaded to the whiteboard 120 and serve as the basis to be translated into a goal 116. Via curation by the well-wishing community and/or feedback with merchants 142. The development white-boarding process may include automatically importing information regarding a user 114 or a particular group of users 114 to which the user 114 in question belongs. This imported information may be gathered automatically, semi-automatically or manually and may include information derived directly from the user 114, indirectly from a user 114 (e.g., via accessing various data bases with which the user 114 has provided information, such as a transaction history stored in a data base), and/or from other users 114 or parties (152, 142, 132) with which the user 142 has some linkage or association.

The whiteboard 120 also permits users 114 to publicize their wishes, goals and aspirations 116, e.g., using social media connections (e.g., social networks 151) to friends 152, contacts, etc. In an example, a user 114 may have their wishes, goals or aspirations 116 shared with family and friends (152) identified by the whiteboard 120, e.g., using social media connections or using information within the whiteboard system 120 itself, e.g., other users 114 having similar wishes, goals or aspirations 114, domain experts in these areas, commercial or corporate users 142 and 132, etc. In an aspect, the whiteboard system 120 may facilitate publicizing or sharing of a user's wishes, goals and aspirations 116, e.g., via suggesting other users 114 to whom the subject user 114 may publicize information, facilitating introductions. The whiteboard system 120 may offer suggested messaging language given the nature of the particular users 114, etc. In one embodiment, the whiteboard 120 may intelligently identify users 114 sharing common attributes in order to facilitate interaction there-between, e.g., with goal of building mutually beneficial relationships between users 114. This may be thought of as the whiteboard 120 automatically leveraging artificial intelligence systems to facilitate such interactions between users 114.

Such interaction and facilitation of the same may take place on several different levels with several different aims. For example, the whiteboard 120 may allow users 114 sharing similar wishes, goals and aspirations 116 to contact one another and interact using the whiteboard platform 120. This may be extended to facilitating users 114 accomplishing a common plan item (116), e.g., saving towards the purchase of the same particular item, securing lending or financing for the same, accessing a domain expert that may consult more than one user 114 having a similar interest, etc.

In another example, different types of users 114 may be encouraged to interact with one another. By way of specific example, a user 114 having a particular wish, goal or aspiration 116 may be linked to a user 114 (or other party associated with the system 100) having some domain expertise in the area of that wish, goal or aspiration 116. In at least one embodiment, the whiteboard 120 itself may act as a virtualized user having domain expertise in an area, e.g., financial counseling, life coaching, etc. In another embodiment, the whiteboard 120 may automate the initial contact or linkage between actual, human domain experts and/or other users 114 and a user 114 that has expressed a wish, goal or aspiration 116. This may be accomplished by facilitating communications among users 114, by suggesting links or contacts, prepopulating messages to encourage users 114 to make contact with one another, sending automated messages on behalf of users 114, etc.

The whiteboard 120 may be utilized to facilitate commercial activities that are aligned with users' expressed wishes, goals and aspirations 116 and plans 118 for pursuing the same. For example, the whiteboard 120 may collect, filter and present various metrics that are of interest to various users 114, e.g., different types of users 114 within the whiteboard system 120 sharing a particular wish, goal or aspiration 116, having made a particular degree of progress on a plan 118 to accomplish the same (e.g., particular amount of time working towards a wish goal or aspiration 116, particular level of savings being achieved, particular group of similarly aligned users 114 reaching a predetermined number threshold for gathering an expert or celebrity's attention, etc.). By way of example, the whiteboard 120 may facilitate dissemination of information, either detailed or generalized (e.g., with privacy of users 114 in. mind), to various users 114 for accomplishing such facilitated collaboration. For example, individual users 114 may be given information regarding other users 114 within the whiteboard 120 that have similar wishes, goals or aspirations 116 such that interaction and collaboration there-between may be facilitated.

As another example, users 114 of different types may be given information about one another's presence within the whiteboard 120. By way of specific example, commercial or corporate vendors 142 or commercial users 114 may be given information regarding a number of users 114 having a particular wish, goal or aspiration 116 such that the commercial or corporate venders 142 are apprised of the same. This may be leveraged to facilitate corporate or commercial venders 142 contacting individual users 114 or groups thereof with special offers and the like. Likewise, in a complementary way, individual users 114 or groups thereof may be given information regarding commercial or corporate venders 142 with the whiteboard system 120, e.g., those offering goods or services that match some or part of a particular user's plan 118 for achieving a wish, goal or aspiration 116.

The whiteboard 120 may be utilized in exchange for various items. For example, the operator of the system 100 including the whiteboard 120 or portion thereof may not charge a fee for use, e.g., for individual users 114 or groups thereof. In an embodiment, the operator of the system 100 or portion thereof may charge a fee for use, e.g., for corporate or commercial venders 142 to have access to information regarding individual users 142 or for having direct access or linkage thereto. In one embodiment, the whiteboard 120 may include commercial mechanisms, e.g., such as facilitating online shopping for goods and services offered among the users 114 of the whiteboard 120 and payment for the same. Additionally, the whiteboard 120 may operate to collect fees from various users, e.g., transaction fees, etc.

One of the aspects of the system 100 is redefining what "money" is in terms of equity/value-exchange that can be redeemed to realize aspirations 116. For example, the system 100 expands the concept of "money" into useful forms such as social equity, which may be implemented by a mechanism that rewards or values social standing in an ecosystem. The system 100 also provides for content equity, which may be implemented by a mechanism that rewards or values thought-leadership, content, work-products created, etc. The system 100 also provides for endorsement equity, which may be implemented by a mechanism that rewards or values endorsement by others within the ecosystem. The system 100 also provides for monetary equity, i.e., cash savings.

The system 100 invention provides a more holistic or end-to-end process for users. As shown, compared to other implementations the system 100 facilitates a complete experience by allowing users 114 to aspire (e.g., formulate and organize their desires), identify a goal 116 and achieve their intentions to buy, plan accordingly for the same 118, and fulfill these plans. For example, the system 100 provides a platform that includes the ability to fulfill an aspiration 116 through lending (e.g., from the trusted crowd friends, family, and/or community, as well as merchants/banks) in addition to utilizing their savings. The system 100 provides a platform that includes the ability to fulfill an aspiration 116 through an auctioning/bidding-process, e.g., including involvement of merchants 142 (especially for unique and highly specialized aspired to items) in addition to group-buying (e.g., the latter may be more prevalent where there are a plurality (e.g., hundreds/thousands/millions) of users 114 aspiring for the same and/or similar items.

The system 100 provides a platform that includes the ability to fulfill an aspiration 116 through a capability to personalize/customize a more generic merchandise item through emergent technologies such as virtual reality, 3-D printing, space travel, etc. The system 100 includes the ability to capture an aspired item/object/moment from either the physical environment (e.g., by taking 2D/3D photos), media environment (TV, ads, etc.), digital environment (e.g., items that show up in an internet-browsing session), or virtual worlds (e.g., from video-gaming and virtual reality simulations) and then recreating them by deploying emergent technologies noted above to realize the same.

The system 100 includes a capability to enable, track, and invoke reciprocity in the collaborative savings process across short, intermediate, and long-time horizons. For example, if Jack supports Jill's aspiration of "Vacation in Hawaii" in cash or kind (e.g., a ride to the airport), such support can be tracked in the whiteboard (INSPIRAVE™) platform 120 over time (in the form of points, etc., in a variety of physical or virtual currencies). In turn, when Jack may be aspiring to save/buy e.g., an "engagement ring", the platform may prompt/designate Jill as part of Jack's "collaborative savings community" through a historic recall of the support he had rendered to Jill earlier.

The system 100 includes a capability to co-create content and merchandise as shown in FIG. 10 and discussed above. Co-creation of content and merchandise extends beyond the merchant-user interface, for example, the user 114 may write the equivalent of a "statement of intent" or create artifacts (with co-authors from the community) that help the user 114 recruit the support of his trusted crowd, friends, family, community, etc. Likewise, the user 114 (e.g., drawing from several of the teachings referenced above) may employ such techniques to result in the aspired item evolving based on user-community/manufacturer/merchant input over time. This helps more closely match products/services with aspirations 116 of the users 114.

The whiteboard 120 of the system 100 permits the articulating and fulfilling of aspirations 116 in the collaboration economy in collaboration with friends and family, with experts and rock-stars or celebrities, school counselors, etc. The system 100 may use several sources of input. For example, the system 100 may leverage the digital "pinning" of artifacts as input, e.g., for finding the folks from past, present, and/or future that truly inspire the user. The system 100 may use such inputs to identify activities that most engage the user 114, and identify strengths through current contraptions (e.g., Meyers-Briggs, Gallup, Strengths finder techniques). For example, the system 100 may reference inputs regarding books and movies and experiences that have most inspired the user 114. The system 100 may use inputs that help to ascertain when the user 114 was the happiest.

The whiteboard 120 of the system 100 allows a user 114 to provide inputs, e.g., to tell a story, e.g., equivalent of a college application essay, where the platform facilitates experts, rock stars/celebrities to recommend aspirations or other inputs. The whiteboard 120 facilitates the recruiting of mentors and personal and professional partners in life. The system 100 facilitates communication such that, e.g., friends and family get to provide input.

The whiteboard 120 may utilize a questionnaire. For example, the whiteboard 120 may utilize a combination of explicit input from user 114 and data-mined input from past history as more data is collected, e.g., with predictive algorithms/analytics and artificial intelligence, to make aspiration 116 suggestions. An embodiment may automate the process of identifying what are the obstacles to achieving a user's identified aspirations 116, e.g., obstacles to achieving a life goal. For example, the whiteboard 120 may automate the identification of money, time, work, responsibilities, etc., that may be needed to achieve the same.

Importantly, the whiteboard 120 also facilitates the process of identifying how a user 114 might overcome obstacles thus identified. This may include a variety of techniques. For example, if a user's progress along a plan 118 that is tracked by the system 100 indicates, or if the user 114 indicates, that he or she feels off track, the whiteboard 120 may automatically suggest ways in which the user 114 may get back on track. For example, an aspiration-commerce item may be one way to help remove obstacles. For example, an embodiment may facilitate the recruitment of rock-stars, celebrities, thought-leaders, etc., i.e., folks that are rock-stars in their chosen field of endeavor in business, athletics, media, etc., to serve as mentors, lunch/dinner-dates, etc., who may be compensated through a combination of equity noted above.

The system 100 of the present invention provides a comprehensive e-commerce solution for user 114 defined aspirational savings 116 that allows for delivery of goods or services associated with aspirations 116 directly to the user 114 from merchant 142; allows for the curation by the well-wishing community (friends, family, advisors, etc.) of the user 114 in developing and modifying the wish, goal and aspirations 116 of specific users 114 and in the developing and modifying the plan 118 associated therewith (modification can include cancellation of the goal 116 as factors may dictate); allows for whiteboard 120 co-creation and personalization of goals or aspirations 116 of users 114 through collaboration between user 114 and merchants 142 and others; provides an e-commerce solution which is not limited merely to financial applications or savings and the platform 100 can be utilized for things outside of money (things money cannot buy—i.e. lunch with a given athlete—social equity, content equity and endorsement equity); yields an e-commerce solution or system 100 that allows for value exchange and value creation; allows for an effective and efficient (less waste) in gift giving and gift receiving by facilitating signals from the user to the well-wishing community, and extensions thereof, regarding what are the user's aspirations for targeted gifting.

With regard to gift giving, the system 100 gives the gift giving participants (users 114 or members 152) options by allowing the donor to donate cash to the account 112, or in the form of a gift card, BITCOIN, loyalty points, and/or payment to merchant 142 directly. The benefit to the donor is elimination of waste and the ability to pay in multiple denomination including denominations that may be less liquid.

The system 100 may be considered as operating as a scalable decentralized peer to peer network not limited to the exchange of value (akin to BLOCKCHAIN) but furthermore as a scalable decentralized peer to peer network for the creation and efficient capture of value.

The present system is not primarily focused upon money management but is rather focused on wish identification, attainment of the goal, and delivery of the goods or services and eliminates the focus on money. The system shifts the focus away from money management and savings, which is often limited by user's inertia (failure to act), and instead the present system is focused on the curated discovery of the goal, tracking progress toward of the goal and fulfillment and delivery of the goal.

The system 100 can allows credit to be added to the mix for wish fulfillment plans 118. For example if pure savings and amplification thereof is not sufficient to obtain the goal 116 within a desired set timeframe, then credit can be issued by a financial institution 132 to the user 118 (or other entity such as the operator of the system 100) to have the goal achieved and delivered in the set timeframe. Furthermore the data points from the savings process can be utilized for expedited and enhanced underwriting of the underlying credit issued. For example, a user 114 may have a goal 116 of buying a house in a given price range and the plan 118 may have a mortgage loan offered by an institution 132 when the plan 118 achieves certain set points (e.g., 25% of the house value) with the loan underwriting being supplemented by the entire process/plan 118 as well has monitoring how the user follows the plan 118. Essentially all of the data developing and implementing the plan 118 can be used for enhanced credit underwriting process in ways that both decrease costs and terms for the user and decrease risk to the lender.

The system 100 can incorporate a self or community insurance aspects into goals and aspirations 116. For example a user 114 may set a goal of always maintaining a given monthly income, and if circumstances change and the user 114 no longer has the designated income, the system 100 enables messaging to other in their well-wishing community (such as other prior beneficiaries to whom the user has previously donated), and these can quickly offer their own assistance, equivalent employment opportunities or income as possible. Institutions 132 or merchants 142 can underwrite select goals 116 in more conventional insurance contexts, as appropriate for the given goal. Essentially all of the data developing and implementing the plan 118 can be used for enhanced insurance underwriting process both decreasing costs and terms for the user and decrease risk to the insurer.

It will be apparent the described embodiments are illustrative of the present invention and not restrictive thereof. Many variations to the present invention would be obvious to those of ordinary skill in the art, without departing from the spirit and scope of the present invention. The present invention is defined by the appended claims and equivalents thereto.

What is claimed is:

1. An Internet based user controlled aspirational savings social network system (100) comprising:

at least one hardware server (113) comprising at least one computer processor upon which is stored a host electronic network platform (110) configured to host individual accounts (112) for a plurality of individual platform users (114), wherein each individual account (112) is assigned as aspirational goal (116) of goods and/or services by the account user (114), wherein the goods and services of the goal (116) are available from merchants (142) who have individual access (140) to the host electronic network platform (110), and wherein the host electronic network platform (110) develops, modifies, and monitors a savings plan (118) associated with each individual account (112);

an aspirational goal authoring tool (120) on the host electronic network platform (110) that is housed on at least one server (113), wherein the aspirational authoring tool (120) is accessible by the individual platform users (114) on the Internet via the user's own electronic devices, wherein the aspirational authoring tool (120) includes at least one predefined category (122) of prospective aspirational goods and services to assist the user in assigning a goal (116) and wherein the aspirational authoring tool (120) is configured to assist individual platform users (114) in discovery and articulation of specific aspirational goals (116) to be assigned to each individual account of the user (114) by receiving inputs from the merchants (142) regarding prospective aspirational goods and services from third parties regarding prospective aspirational goods and services, and wherein the aspirational authoring tool (120) assigns at least an initial monetary goal amount associated with an individual account (112) based upon the specific aspirational goal's goods and/or services which is available from merchants (142) who have individual access (140) to the host electronic network platform (110), and wherein the aspirational authoring tool (120) develops a proposed savings plan (118) associated with the aspirational goal (116) which is assigned to the individual account (112);

a financial institution interface (130) on the host network platform (110) that is housed on at least one server (113), wherein the financial institution interface (130) is configured to engage with at least one financial institution (132) and interacts with the aspirational goal authoring tool (120) to associated each individual account (112) associated with the aspirational goal (116) with one associated depository account with one associated financial institution (132);

a collaborative savings amplifications tool (150) on the host electronic network platform (110) that is housed on at least one server (113), wherein the collaborative savings amplification tool (150) is configured to increase the effective monetary amounts in an individual account (112) to advance the savings plan (118) developed by the aspirational authoring tool (120) to achieve the aspirational goal associated with goods and/or services of the merchants (142) above the principal contributions of the user (114), wherein the collaborative savings amplification tool (150) includes i) social network (151) based crowdfunding of a specific aspirational goal (116) assigned to one of an individual user's accounts (112) by a user designated well-wishing community, wherein crowdfunding includes both potential monetary amounts into the one associated depository account with one associated financial institution (132) and non-monetary contributions which can advise, guide, motivate, modify, and fulfill a user aspirational, wherein the non-monetary contributions are utilized by the aspirational authoring tool (120) regarding prospective aspirational goods and services; and wherein the collaborative savings amplification tool (150) includes at least one of: ii) gamification of individual accounts (112); iii) group purchasing discounts from merchants (142) with access to the system (100) which provides the goods and services attributable to the goals (116) of an individual user's accounts (112) wherein a group for group purchasing is formed by a collection of individual platform user's having aligned aspirational goals (116); iv) reverse auction from a merchant (142) with access to the system (100) which provides the goods and services associated with the user's goal (116); v) maximization of the interest for the individual account (112); vi) content co-creation and vii) a user budgeting tool including data analytics to help the user (114) to budget;

a relationship scoring system (170) on the host network platform (110) that is housed on at least one server (113), wherein the relationship scoring system (170) interacts with the collaborative savings amplifications tool (150) and the aspirational authoring tool (120) to review the monetary and non-monetary contributions of a user's designated well-wishing community to quantify participation in the executed savings plan (118) for each user's goals (116); and a merchant interface (140) on the host network platform (110) that is housed on at least one server (113), wherein the merchant interface is configured to engage with and be accessed by the plurality of merchants(142) of goods and services associated with each aspirational goal (116) of each individual account (112), wherein the merchant interface interacts with the system (100) to allow the merchants(142) to provide input to the aspirational authoring tool (120) for associating goods and services with the user's goal (116).

2. The Internet based user controlled aspirational savings system (100) according to claim 1, wherein the system (100) enables and empowers co-ownership or co-access of select goods or services forming the aspirations (116) of select users (114).

3. The Internet based user controlled aspirational savings system (100) according to claim 1, wherein the host network platform (110) is configured to co-ordinate the physical or virtual delivery of the goods and service associated with the aspirational goal (116) of an individual account (112) to the user (114) at a user designated location from the merchant (142) when the savings plan (118) associated with that individual account (112) has been achieved, and wherein the host network platform (110) is configured to co-ordinate the transfer of monetary amount from an individual account (112) to the merchant (142) for the goods and service associated with the aspirational goal (116) when the plan (118) associated with that individual account (112) has been achieved.

4. The Internet based user controlled aspirational savings system (100) according to claim 1, wherein the relationship scoring system (170) which quantifies the participation of other users (114) for each user's goals (116) are configures to be utilized over time to determine a user's standing, including reputational and endorsement equity, that may be considered by others.

5. The Internet based user controlled aspirational savings system (100) according to claim 1, wherein the host electronic network platform (110) provides users feedback in the form of curation, advice, social trade-off analysis and/or voting from the user's well-wishing community through which a more informed aspiration is identified, refined or canceled and which drives the development of the savings plan (118) associated with each individual account (112) and wherein the host electronic network platform (110) monitors a savings plan (118) associated with each individual account (112) and provides visual indication of the amount of progress of the savings plan (118).

6. The Internet based user controlled aspirational savings system (100) according to claim 1, wherein the host electronic network platform (110) which develops a savings plan (118) associated with each individual account (112) includes developing a savings and purchase timeline for the savings plan (118).

7. The Internet based user controlled aspirational savings system (100) according to claim 1, wherein the financial institution interface (130) on the host network platform (110) is configured to assist in credit underwriting by at least one associated financial institution (130) associated with a user's goal (116).

8. The Internet based user controlled aspirational savings system (100) according to claim 1, wherein the financial institution interface (130) on the host network platform (110) reviews a plurality of depository account types offered by a plurality of financial institutions in the establishment of each individual account (112) as a depository account with one associated financial institution (132), wherein such review can include arbitrage across such different institutions (132) to obtain the best offer/rate/terms to optimize return for the user (114).

9. The Internet based user controlled aspirational savings system (100) according to claim 1, wherein the aspirational goal authoring tool (150) assists individual platform users (114) in discovery and articulation of specific aspirational goals (116) to be assigned to each individual account (112) of the user (114) through the use of questionnaires filled out by the user (114) and images uploaded by the user (114).

10. The Internet based user controlled aspirational savings system (100) according to claim 1, wherein the collaborative savings amplifications tool (150) includes enabling the user (114) to designate a set of social network users associated with an individual user's account that form the user's designated well-wishing community and to whom the user-aspiration are narrowcast or designated subset thereof, whereby the user (114) is empowered to send information to a limited set of users securely such that no one outside the narrowcast group obtains the requests.

11. The Internet based user controlled aspirational savings system (100) according to claim 10, wherein system (100) can receive and assign monetary amounts to an individual's user account (112) from any member of the user's designated well-wishing community.

12. The Internet based user controlled aspirational savings system (100) according to claim 10, wherein the host electronic network platform (110) provides users feedback in the form of curation, advice, social trade-off analysis and/or voting from the user's well-wishing community through which a more informed goal (116) is identified, refined or canceled and which drives the development of the savings plan associated with each individual account.

13. The Internet based user controlled aspirational savings system (100) according to claim 1, wherein the system (100) is configured such that the user (114) may be any one of an individual, plurality of individuals, and organization or plurality of organizations and whereby the parties donating to the user (114) may be any one of an individual, plurality of individuals, and organization or plurality of organizations, and wherein a plurality of financial institutions (132) access the system (100) through the financial institution interface (132) and a plurality of merchants (142) access the system (100) through the merchant interface (140).

14. The Internet based user controlled aspirational savings system (100) according to claim 1, wherein the collaborative savings amplifications tool (150) includes group purchasing discounts attributable to an individual user's accounts (112) wherein a group for group purchasing is formed by a collection of individual platform user's having aligned aspirational goals (116), and wherein the groups for group purchasing include groups created by the individual platform users (114).

15. The Internet based user controlled aspirational savings system (100) according to claim 14, wherein the collaborative savings amplifications tool (150) includes content co-creation by the individual platform users (114), by any combination of the merchants (142), financial institutions (132), members of the user designated well-wishing community and/or user designated broader audience, or the host network platform (110) itself.

16. The Internet based user controlled aspirational savings system (100) according to claim 1, wherein the system (100) is configured to utilize the specific aspirational goal (116) of the user (114), other user information and the user's progress with the given plan (118) to perform credit or insurance underwriting associated with the specific aspiration goal (116) of the user (114).

17. The Internet based user controlled aspirational savings system (100) according to claim 1, wherein the collaborative savings amplifications tool (150) includes gamification of individual accounts (112), including gamification by any combination of the merchants (142), financial institutions (132), members of the user designated well-wishing community and/or user designated broader audience, or the host network platform (110) itself.

* * * * *